United States Patent
Sidler et al.

(10) Patent No.: US 9,990,683 B2
(45) Date of Patent: *Jun. 5, 2018

(54) SYSTEMS AND METHODS FOR ACQUIRING, ACCESSING, AND ANALYZING INVESTIGATIVE INFORMATION

(71) Applicant: Securus Technologies, Inc., Dallas, TX (US)

(72) Inventors: James S. Sidler, Lubbock, TX (US); John J. Viola, Frisco, TX (US); Michelle L. Polozola, Richardson, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/135,199

(22) Filed: Apr. 21, 2016

(65) Prior Publication Data

US 2016/0239932 A1 Aug. 18, 2016

Related U.S. Application Data

(63) Continuation of application No. 11/480,268, filed on Jun. 30, 2006, which is a continuation-in-part of (Continued)

(51) Int. Cl.
*H04M 1/24* (2006.01)
*H04M 3/08* (2006.01)
(Continued)

(52) U.S. Cl.
CPC ......... *G06Q 50/265* (2013.01); *G06Q 10/10* (2013.01); *G10L 15/26* (2013.01);
(Continued)

(58) Field of Classification Search
USPC .................................. 379/32.01, 35
See application file for complete search history.

(56) References Cited

U.S. PATENT DOCUMENTS 3,096,404 A 7/1963 Semon
3,113,185 A 12/1963 Semon
(Continued)

FOREIGN PATENT DOCUMENTS

EP 0185365 A1 6/1986
EP 0814583 A2 12/1997
(Continued)

OTHER PUBLICATIONS

Definition of "logic," IEEE 100: "The Authoritative Dictionary of IEEE Standards Terms", IEEE Press, Standards Information Network 7th ed. 2000.
(Continued)

*Primary Examiner* — Quoc D Tran
(74) *Attorney, Agent, or Firm* — Fogarty LLP

(57) ABSTRACT

Disclosed are systems and methods which provide availability of information on a network wide basis, with the network or information technology (IT) fabric spanning a wide range of institutions and other sources of information, including correctional facilities, without regard to which jurisdiction the source of information belongs, e.g. police, courts, federal investigation agencies, public databases etcetera. Embodiments provide an electronic based capability to identify useful information and for locating, collecting, compiling, aggregating, distilling, and/or reporting robust data.

23 Claims, 9 Drawing Sheets

Related U.S. Application Data application No. 11/182,625, filed on Jul. 15, 2005, now abandoned, which is a continuation-in-part of application No. 10/720,848, filed on Nov. 24, 2003, now abandoned, which is a continuation-in-part of application No. 10/135,878, filed on Apr. 29, 2002, now abandoned.

(51) Int. Cl.
| | |
|---|---|
| *H04M 3/22* | (2006.01) |
| *G06Q 50/26* | (2012.01) |
| *H04L 29/06* | (2006.01) |
| *G06Q 10/10* | (2012.01) |
| *G10L 15/26* | (2006.01) |
| *H04L 12/24* | (2006.01) |
| *H04L 12/26* | (2006.01) |
| *H04L 12/18* | (2006.01) |
| *H04M 3/42* | (2006.01) |
| *G10L 15/04* | (2013.01) |
| *G10L 15/08* | (2006.01) |
| *G10L 15/18* | (2013.01) |

(52) U.S. Cl.
CPC ...... *H04L 12/1827* (2013.01); *H04L 12/1831* (2013.01); *H04L 41/22* (2013.01); *H04L 43/10* (2013.01); *H04L 63/302* (2013.01); *H04M 3/2281* (2013.01); *G10L 15/04* (2013.01); *G10L 15/1822* (2013.01); *G10L 2015/088* (2013.01); *H04M 3/42221* (2013.01); *H04M 2203/301* (2013.01)

(56) References Cited

U.S. PATENT DOCUMENTS

| | | |
|---|---|---|
| 3,350,515 A | 10/1967 | Semon |
| 3,397,288 A | 8/1968 | Semon |
| 3,398,288 A | 8/1968 | Sanders et al. |
| 3,626,107 A | 12/1971 | Armstrong et al. |
| 3,660,610 A | 5/1972 | Hestad et al. |
| 3,676,605 A | 7/1972 | Johnson |
| 3,790,700 A | 2/1974 | Callais et al. |
| 3,798,359 A | 3/1974 | Feistel |
| 3,798,382 A | 3/1974 | Hoven |
| 3,798,605 A | 3/1974 | Feistel |
| 3,806,874 A | 4/1974 | Ehrat |
| 3,813,495 A | 5/1974 | Conerly |
| 3,829,617 A | 8/1974 | Caithamer et al. |
| 3,851,121 A | 11/1974 | Marvin |
| 3,864,519 A | 2/1975 | Owen |
| 3,952,160 A | 4/1976 | Pasternack et al. |
| 3,985,956 A | 10/1976 | Monti et al. |
| 3,997,731 A | 12/1976 | Wilmot et al. |
| 4,001,513 A | 1/1977 | Naylor |
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |
| 4,156,799 A | 5/1979 | Cave |
| 4,188,508 A | 2/1980 | Rogers et al. |
| 4,196,317 A | 4/1980 | Bartelink |
| 4,310,726 A | 1/1982 | Asmuth |
| 4,319,091 A | 3/1982 | Meri |
| 4,326,123 A | 4/1982 | Hosterman |
| 4,333,056 A | 6/1982 | Cave |
| 4,371,752 A | 2/1983 | Matthews et al. |
| 4,387,274 A | 6/1983 | Stein et al. |
| 4,405,833 A | 9/1983 | Cave et al. |
| 4,439,636 A | 3/1984 | Newkirk et al. |
| 4,445,211 A | 4/1984 | Webber |
| 4,477,698 A | 10/1984 | Szlam et al. |
| 4,518,825 A | 5/1985 | Brinkerhoff et al. |
| 4,538,030 A | 8/1985 | Fossett et al. |
| 4,540,855 A | 9/1985 | Szlam et al. |
| 4,552,996 A | 11/1985 | de Bergh |
| 4,559,416 A | 12/1985 | Theis et al. |
| 4,585,904 A | 4/1986 | Mincone et al. |
| 4,593,157 A | 6/1986 | Usdan |
| 4,595,983 A | 6/1986 | Gehalo et al. |
| 4,602,129 A | 7/1986 | Matthews et al. |
| 4,626,630 A | 12/1986 | Waldman |
| 4,629,829 A | 12/1986 | Puhl et al. |
| 4,644,109 A | 2/1987 | Takeda et al. |
| 4,686,699 A | 8/1987 | Wilkie |
| 4,696,028 A | 8/1987 | Morganstein et al. |
| 4,696,031 A | 9/1987 | Freudberg et al. |
| 4,698,840 A | 10/1987 | Dively et al. |
| 4,712,230 A | 12/1987 | Rice et al. |
| 4,723,273 A | 2/1988 | Diesel et al. |
| 4,726,057 A | 2/1988 | Doerry et al. |
| 4,727,577 A | 2/1988 | Frey et al. |
| 4,731,818 A | 3/1988 | Clark, Jr. et al. |
| 4,736,405 A | 4/1988 | Akiyama |
| 4,737,982 A | 4/1988 | Boratgis et al. |
| 4,746,786 A | 5/1988 | Heberle et al. |
| 4,763,350 A | 8/1988 | Immendorfer et al. |
| 4,766,604 A | 8/1988 | Axberg |
| 4,768,223 A | 8/1988 | Kinoshita et al. |
| 4,768,227 A | 8/1988 | Dively et al. |
| 4,769,834 A | 9/1988 | Billinger et al. |
| 4,777,647 A | 10/1988 | Smith et al. |
| 4,781,516 A | 11/1988 | Maybach et al. |
| 4,791,640 A | 12/1988 | Sand |
| 4,794,642 A | 12/1988 | Arbabzadah et al. |
| 4,797,910 A | 1/1989 | Daudelin |
| 4,799,255 A | 1/1989 | Billinger et al. |
| 4,802,207 A | 1/1989 | Uchida |
| 4,803,718 A | 2/1989 | Neil et al. |
| 4,815,120 A | 3/1989 | Kosich |
| 4,825,460 A | 4/1989 | Carter et al. |
| 4,839,917 A | 6/1989 | Oliver |
| 4,850,011 A | 7/1989 | Delmege et al. |
| 4,868,873 A | 9/1989 | Kamil |
| 4,885,765 A | 12/1989 | Shirakawa |
| 4,890,317 A | 12/1989 | Hird et al. |
| 4,894,716 A | 1/1990 | Aschwanden et al. |
| 4,896,348 A | 1/1990 | Grantland et al. |
| 4,899,358 A | 2/1990 | Blakley |
| 4,899,375 A | 2/1990 | Bauer et al. |
| 4,901,341 A | 2/1990 | Carter et al. |
| 4,908,852 A | 3/1990 | Hird et al. |
| 4,916,733 A | 4/1990 | Smith et al. |
| 4,920,562 A | 4/1990 | Hird et al. |
| 4,922,519 A | 5/1990 | Daudelin |
| 4,922,520 A | 5/1990 | Bernard et al. |
| 4,924,488 A | 5/1990 | Kosich |
| 4,924,501 A | 5/1990 | Cheeseman et al. |
| 4,932,062 A | 6/1990 | Hamilton |
| 4,933,966 A | 6/1990 | Hird et al. |
| 4,933,967 A | 6/1990 | Lo et al. |
| 4,935,956 A | 6/1990 | Hellwarth et al. |
| 4,937,856 A | 6/1990 | Natarajan |
| 4,937,862 A | 6/1990 | Kosich |
| 4,943,995 A | 7/1990 | Daudelin et al. |
| 4,944,001 A | 7/1990 | Kizuik et al. |
| 4,947,422 A | 8/1990 | Smith et al. |
| 4,947,425 A | 8/1990 | Grizmala et al. |
| 4,979,214 A | 12/1990 | Hamilton |
| 4,991,203 A | 2/1991 | Kakizawa |
| 4,993,062 A | 2/1991 | Dula et al. |
| 4,993,068 A | 2/1991 | Piosenka et al. |
| 5,003,595 A | 3/1991 | Collins et al. |
| 5,008,923 A | 4/1991 | Kitamura et al. |
| 5,020,095 A | 5/1991 | Morganstein et al. |
| 5,022,067 A | 6/1991 | Hughes |
| 5,023,869 A | 6/1991 | Grover et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,093,858 A | 3/1992 | Hird et al. |

(56) References Cited

U.S. PATENT DOCUMENTS

| | | |
|---|---|---|
| 5,109,405 A | 4/1992 | Morganstein |
| 5,131,024 A | 7/1992 | Pugh et al. |
| 5,134,651 A | 7/1992 | Ortiz et al. |
| 5,150,357 A | 9/1992 | Hopner et al. |
| 5,153,907 A | 10/1992 | Pugh et al. |
| 5,155,761 A | 10/1992 | Hammond |
| 5,163,083 A | 10/1992 | Dowden et al. |
| 5,164,989 A | 11/1992 | Brandman et al. |
| 5,181,237 A | 1/1993 | Dowden et al. |
| 5,185,781 A | 2/1993 | Dowden et al. |
| 5,187,740 A | 2/1993 | Swaim et al. |
| 5,193,110 A | 3/1993 | Jones et al. |
| 5,200,995 A | 4/1993 | Gaukel et al. |
| 5,210,789 A | 5/1993 | Jeffus et al. |
| 5,216,702 A | 6/1993 | Ramsden |
| 5,218,636 A | 6/1993 | Hamilton |
| 5,220,501 A | 6/1993 | Lawlor |
| 5,222,120 A | 6/1993 | Mcleod et al. |
| 5,229,764 A | 7/1993 | Matchett et al. |
| 5,247,569 A | 9/1993 | Cave |
| 5,255,305 A | 10/1993 | Sattar |
| 5,274,698 A | 12/1993 | Jang |
| 5,276,731 A | 1/1994 | Arbel et al. |
| 5,283,825 A | 2/1994 | Druckman et al. |
| 5,283,829 A | 2/1994 | Anderson |
| 5,287,401 A | 2/1994 | Lin |
| 5,305,312 A | 4/1994 | Fornek et al. |
| 5,309,505 A | 5/1994 | Szlam et al. |
| 5,311,589 A | 5/1994 | Bennett et al. |
| 5,319,701 A | 6/1994 | Hird et al. |
| 5,319,702 A | 6/1994 | Kitchin et al. |
| 5,321,754 A | 6/1994 | Fisher et al. |
| 5,323,448 A | 6/1994 | Biggs et al. |
| 5,325,421 A | 6/1994 | Hou et al. |
| 5,325,427 A | 6/1994 | Dighe |
| 5,327,489 A | 7/1994 | Anderson et al. |
| 5,329,578 A | 7/1994 | Brennan et al. |
| 5,333,181 A | 7/1994 | Biggs |
| 5,335,266 A | 8/1994 | Richardson, Jr. et al. |
| 5,345,501 A | 9/1994 | Shelton |
| 5,345,595 A | 9/1994 | Johnson et al. |
| 5,351,285 A | 9/1994 | Katz |
| 5,351,287 A | 9/1994 | Bhattacharyya et al. |
| 5,355,403 A | 10/1994 | Richardson, Jr. et al. |
| 5,369,699 A | 11/1994 | Page et al. |
| 5,375,161 A | 12/1994 | Fuller et al. |
| 5,381,474 A | 1/1995 | Landemaki et al. |
| 5,394,465 A | 2/1995 | Jo |
| 5,416,831 A | 5/1995 | Chewning, III et al. |
| 5,425,087 A | 6/1995 | Gerber et al. |
| 5,428,662 A | 6/1995 | Hamilton |
| 5,442,696 A | 8/1995 | Lindberg et al. |
| 5,450,485 A | 9/1995 | Hamilton |
| 5,452,347 A | 9/1995 | Iglehart et al. |
| 5,455,819 A | 10/1995 | Sugiyama |
| 5,461,665 A | 10/1995 | Shur et al. |
| 5,465,293 A | 11/1995 | Chiller et al. |
| 5,465,387 A | 11/1995 | Mukherjee |
| 5,471,519 A | 11/1995 | Howe et al. |
| 5,473,686 A | 12/1995 | Virdee |
| 5,483,582 A | 1/1996 | Pugh et al. |
| 5,483,593 A | 1/1996 | Gupta et al. |
| 5,485,507 A | 1/1996 | Brown et al. |
| 5,497,414 A | 3/1996 | Bartholomew |
| 5,504,810 A | 4/1996 | McNair |
| 5,517,555 A | 5/1996 | Amadon et al. |
| 5,524,141 A | 6/1996 | Braun et al. |
| 5,524,145 A | 6/1996 | Parker |
| 5,535,261 A | 7/1996 | Brown et al. |
| 5,539,812 A | 7/1996 | Kitchin et al. |
| 5,544,231 A | 8/1996 | Cho |
| 5,566,229 A | 10/1996 | Hou et al. |
| 5,577,116 A | 11/1996 | Townsend et al. |
| 5,583,920 A | 12/1996 | Wheeler, Jr. |
| 5,583,934 A | 12/1996 | Zhou |
| 5,606,604 A | 2/1997 | Rosenblatt et al. |
| 5,617,471 A | 4/1997 | Rogers et al. |
| 5,619,561 A | 4/1997 | Reese |
| 5,627,887 A | 5/1997 | Freedman |
| 5,634,126 A | 5/1997 | Norell |
| 5,651,056 A | 7/1997 | Eting et al. |
| 5,655,013 A | 8/1997 | Gainsboro |
| 5,666,157 A | 9/1997 | Aviv |
| 5,682,386 A | 10/1997 | Arimili et al. |
| 5,722,418 A | 3/1998 | Bro |
| 5,724,404 A | 3/1998 | Garcia et al. |
| 5,742,905 A | 4/1998 | Pepe et al. |
| 5,745,553 A | 4/1998 | Mirville et al. |
| 5,745,558 A | 4/1998 | Richardson, Jr. et al. |
| 5,757,781 A | 5/1998 | Gilman et al. |
| 5,757,889 A * | 5/1998 | Ohtake ............... H04M 3/2272 379/12 |
| 5,768,355 A | 6/1998 | Salibrici et al. |
| 5,777,558 A | 7/1998 | Pennypacker et al. |
| 5,793,415 A | 8/1998 | Gregory, III et al. |
| 5,796,811 A | 8/1998 | McFarlen |
| 5,799,068 A | 8/1998 | Kikinis et al. |
| 5,805,685 A | 9/1998 | McFarlen |
| 5,809,125 A | 9/1998 | Gammino |
| 5,832,068 A | 11/1998 | Smith |
| 5,844,978 A | 12/1998 | Reuss |
| 5,859,907 A | 1/1999 | Kawahara et al. |
| 5,861,810 A | 1/1999 | Nguyen |
| 5,862,519 A | 1/1999 | Sharma et al. |
| 5,867,559 A | 2/1999 | Jorgensen et al. |
| 5,875,230 A | 2/1999 | Ganley et al. |
| 5,883,945 A | 3/1999 | Richardson et al. |
| 5,907,602 A | 5/1999 | Peel et al. |
| 5,915,001 A | 6/1999 | Uppaluru |
| 5,923,746 A | 7/1999 | Baker et al. |
| 5,926,533 A | 7/1999 | Gainsboro |
| 5,937,035 A | 8/1999 | Andruska et al. |
| 5,937,042 A | 8/1999 | Sofman |
| 5,943,403 A | 8/1999 | Richardson, Jr. et al. |
| 5,946,375 A | 8/1999 | Pattison et al. |
| 5,946,386 A | 8/1999 | Rogers et al. |
| 5,960,064 A | 9/1999 | Foladare et al. |
| 5,991,373 A | 11/1999 | Pattison et al. |
| 6,031,895 A | 2/2000 | Cohn et al. |
| 6,038,315 A | 3/2000 | Strait et al. |
| 6,052,454 A | 4/2000 | Kek et al. |
| 6,058,163 A | 5/2000 | Pattison et al. |
| 6,064,963 A * | 5/2000 | Gainsboro ............... G10L 15/26 379/88.01 |
| 6,072,860 A | 6/2000 | Kek et al. |
| 6,075,843 A | 6/2000 | Cave |
| 6,078,892 A | 6/2000 | Anderson et al. |
| 6,097,804 A | 8/2000 | Gilbert et al. |
| 6,108,642 A | 8/2000 | Findley |
| 6,118,860 A | 9/2000 | Hillson et al. |
| 6,119,103 A | 9/2000 | Basch et al. |
| 6,134,320 A | 10/2000 | Swan et al. |
| 6,141,406 A | 10/2000 | Johnson |
| 6,169,789 B1 | 1/2001 | Rao et al. |
| 6,173,284 B1 | 1/2001 | Brown |
| 6,175,831 B1 | 1/2001 | Weinreich et al. |
| RE37,073 E | 2/2001 | Hammond |
| 6,188,751 B1 | 2/2001 | Scherer |
| 6,249,570 B1 | 6/2001 | Glowny et al. |
| 6,308,171 B1 | 10/2001 | De La Huerga |
| 6,320,946 B1 | 11/2001 | Enzmann |
| 6,320,948 B1 | 11/2001 | Heilmann et al. |
| 6,324,280 B2 | 11/2001 | Dunn et al. |
| 6,330,546 B1 | 12/2001 | Gopinathan et al. |
| 6,363,065 B1 | 3/2002 | Thornton et al. |
| 6,366,653 B1 | 4/2002 | Yeh et al. |
| 6,381,321 B1 | 4/2002 | Brown et al. |
| 6,404,764 B1 | 6/2002 | Jones et al. |
| 6,404,857 B1 | 6/2002 | Blair et al. |
| 6,404,870 B1 | 6/2002 | Kia |
| 6,445,682 B1 | 9/2002 | Weitz |
| 6,480,590 B1 | 11/2002 | Ku |
| 6,487,200 B1 | 11/2002 | Fraser |
| 6,496,477 B1 | 12/2002 | Perkins et al. |

(56) References Cited

U.S. PATENT DOCUMENTS

| | | |
|---|---|---|
| 6,513,119 B1 | 1/2003 | Wenzel |
| 6,516,056 B1 | 2/2003 | Justice et al. |
| 6,529,500 B1 | 3/2003 | Pandharipande |
| 6,529,602 B1 | 3/2003 | Walker et al. |
| 6,549,613 B1 | 4/2003 | Dikmen |
| 6,553,336 B1 | 4/2003 | Johnson et al. |
| 6,560,323 B2 | 5/2003 | Gainsboro |
| 6,560,325 B2 | 5/2003 | Brown et al. |
| 6,611,583 B1 | 8/2003 | Gainsboro |
| 6,621,812 B1 | 9/2003 | Chapman et al. |
| 6,631,186 B1 | 10/2003 | Adams et al. |
| 6,636,591 B1 | 10/2003 | Swope |
| 6,639,977 B1 | 10/2003 | Swope |
| 6,639,978 B2 | 10/2003 | Draizin et al. |
| 6,647,096 B1 | 11/2003 | Milliorn et al. |
| 6,654,722 B1 | 11/2003 | Aldous et al. |
| 6,658,393 B1 | 12/2003 | Basch et al. |
| 6,665,376 B1 | 12/2003 | Brown |
| 6,665,380 B1 | 12/2003 | Cree et al. |
| 6,668,045 B1 | 12/2003 | Mow |
| 6,687,360 B2 | 2/2004 | Kung et al. |
| 6,688,518 B1 | 2/2004 | Valencia et al. |
| 6,728,338 B1 * | 4/2004 | Kampmeier ........ H04M 3/2281 |
| | | 379/133 |
| 6,731,630 B1 | 5/2004 | Schuster et al. |
| 6,768,792 B2 | 7/2004 | Brown et al. |
| 6,782,370 B1 | 8/2004 | Stack |
| 6,788,775 B1 | 9/2004 | Simpson |
| 6,795,444 B1 | 9/2004 | Vo et al. |
| 6,816,469 B1 | 11/2004 | Kung et al. |
| 6,836,540 B2 | 12/2004 | Falcone et al. |
| 6,876,647 B2 | 4/2005 | Celi, Jr. |
| 6,904,139 B2 | 6/2005 | Brown et al. |
| 6,920,209 B1 * | 7/2005 | Gainsboro .......... H04M 3/2281 |
| | | 379/188 |
| 6,947,525 B2 | 9/2005 | Benco |
| 6,947,532 B1 | 9/2005 | Marchand et al. |
| 6,976,032 B1 | 12/2005 | Hull et al. |
| 6,985,478 B2 | 1/2006 | Pogossiants et al. |
| 7,039,171 B2 | 5/2006 | Gickler |
| 7,042,992 B1 | 5/2006 | Falcone et al. |
| 7,046,779 B2 | 5/2006 | Hesse |
| 7,046,782 B2 | 5/2006 | Miller |
| 7,075,919 B1 | 7/2006 | Wendt et al. |
| 7,075,922 B2 | 7/2006 | Mussman et al. |
| 7,079,636 B1 | 7/2006 | McNitt et al. |
| 7,079,637 B1 | 7/2006 | McNitt et al. |
| 7,085,359 B2 * | 8/2006 | Crites ..................... G06F 21/55 |
| | | 379/112.01 |
| 7,092,494 B1 | 8/2006 | Anders et al. |
| 7,106,843 B1 | 9/2006 | Gainsboro et al. |
| 7,124,438 B2 | 10/2006 | Judge et al. |
| 7,133,831 B2 | 11/2006 | Brown et al. |
| 7,133,845 B1 | 11/2006 | Ginter et al. |
| 7,158,621 B2 | 1/2007 | Bayne |
| 7,188,360 B2 | 3/2007 | Gerdes et al. |
| 7,191,133 B1 | 3/2007 | Pettay |
| 7,203,186 B1 | 4/2007 | Fuller et al. |
| 7,203,301 B1 | 4/2007 | Mudd et al. |
| 7,256,816 B2 | 8/2007 | Profanchik et al. |
| 7,278,028 B1 | 10/2007 | Hingoranee |
| 7,302,053 B2 | 11/2007 | Chang et al. |
| 7,324,637 B2 | 1/2008 | Brown et al. |
| 7,333,798 B2 | 2/2008 | Hodge |
| 7,360,087 B2 | 4/2008 | Jorgensen et al. |
| 7,360,090 B1 | 4/2008 | Doskow et al. |
| 7,372,949 B1 | 5/2008 | Kurth et al. |
| 7,376,622 B1 | 5/2008 | Padalino et al. |
| 7,377,426 B1 | 5/2008 | Makeever |
| 7,409,423 B2 | 8/2008 | Horvitz et al. |
| 7,466,816 B2 | 12/2008 | Blair |
| 7,505,406 B1 | 3/2009 | Spadaro et al. |
| 7,529,357 B1 * | 5/2009 | Rae ........................ H04M 3/38 |
| | | 370/261 |
| 7,551,732 B2 | 6/2009 | Anders |
| 7,640,190 B1 | 9/2009 | Sullivan et al. |
| 7,664,689 B1 | 2/2010 | Rosenfield et al. |
| 7,698,182 B2 | 4/2010 | Falcone et al. |
| 7,783,021 B2 | 8/2010 | Hodge |
| 7,805,457 B1 | 9/2010 | Viola et al. |
| 7,853,243 B2 | 12/2010 | Hodge |
| 7,860,222 B1 * | 12/2010 | Sidler ................... H04L 63/302 |
| | | 379/266.1 |
| 7,899,167 B1 | 3/2011 | Rae |
| 3,000,269 A1 | 8/2011 | Rae et al. |
| 8,031,850 B2 | 10/2011 | Polozola et al. |
| 8,098,804 B1 | 1/2012 | Rae et al. |
| 9,654,620 B2 | 5/2017 | Rae et al. |
| 2001/0034703 A1 | 10/2001 | Picciallo et al. |
| 2001/0036821 A1 | 11/2001 | Gainsboro et al. |
| 2001/0041590 A1 | 11/2001 | Silberfenig et al. |
| 2001/0043697 A1 | 11/2001 | Cox et al. |
| 2001/0047333 A1 | 11/2001 | Kim et al. |
| 2002/0046057 A1 | 4/2002 | Ross |
| 2002/0059148 A1 | 5/2002 | Rosenhaft et al. |
| 2002/0067272 A1 | 6/2002 | Lemelson et al. |
| 2002/0069084 A1 | 6/2002 | Donovan |
| 2002/0071537 A1 | 6/2002 | Gainsboro |
| 2002/0095357 A1 | 7/2002 | Hunter et al. |
| 2002/0107871 A1 | 8/2002 | Wyzga et al. |
| 2002/0147707 A1 | 10/2002 | Kraay et al. |
| 2002/0159440 A1 | 10/2002 | Mussman et al. |
| 2002/0176403 A1 | 11/2002 | Radian |
| 2002/0194096 A1 | 12/2002 | Falcone et al. |
| 2003/0002639 A1 | 1/2003 | Huie |
| 2003/0023874 A1 | 1/2003 | Prokupets et al. |
| 2003/0046208 A1 | 3/2003 | Lubking et al. |
| 2003/0070076 A1 | 4/2003 | Michael |
| 2003/0076940 A1 | 4/2003 | Manto |
| 2003/0091028 A1 | 5/2003 | Chang et al. |
| 2003/0093533 A1 | 5/2003 | Ezerzer et al. |
| 2003/0099337 A1 | 5/2003 | Lord |
| 2003/0126470 A1 | 7/2003 | Crites et al. |
| 2003/0151761 A1 | 8/2003 | Burns |
| 2003/0174695 A1 * | 9/2003 | Lautenschlager ....... H04L 63/00 |
| | | 370/352 |
| 2003/0174826 A1 * | 9/2003 | Hesse ................. H04L 12/1818 |
| | | 379/210.01 |
| 2003/0185204 A1 | 10/2003 | Murdock |
| 2003/0190045 A1 | 10/2003 | Huberman et al. |
| 2003/0233318 A1 | 12/2003 | King et al. |
| 2004/0022237 A1 | 2/2004 | Elliott et al. |
| 2004/0029561 A1 | 2/2004 | Holter et al. |
| 2004/0029564 A1 | 2/2004 | Hodge |
| 2004/0052218 A1 | 3/2004 | Knappe |
| 2004/0078328 A1 | 4/2004 | Talbert et al. |
| 2004/0078341 A1 | 4/2004 | Steichen |
| 2004/0081296 A1 * | 4/2004 | Brown ............... H04M 3/42221 |
| | | 379/88.14 |
| 2004/0120475 A1 | 6/2004 | Bauer et al. |
| 2004/0161086 A1 | 8/2004 | Buntin et al. |
| 2004/0229569 A1 | 11/2004 | Franz |
| 2005/0027723 A1 | 2/2005 | Jones et al. |
| 2005/0114192 A1 | 5/2005 | Tor et al. |
| 2005/0141678 A1 | 6/2005 | Anders |
| 2005/0170818 A1 | 8/2005 | Netanel et al. |
| 2005/0284931 A1 | 12/2005 | Adams et al. |
| 2006/0209797 A1 | 9/2006 | Anisimov et al. |
| 2006/0285650 A1 | 12/2006 | Hodge |
| 2006/0286962 A1 | 12/2006 | Davis |
| 2007/0041545 A1 | 2/2007 | Gainsboro |
| 2007/0071206 A1 | 3/2007 | Gainsboro et al. |
| 2007/0115924 A1 | 5/2007 | Schneider et al. |
| 2007/0242658 A1 | 10/2007 | Rae et al. |
| 2007/0263812 A1 | 11/2007 | Palazola et al. |
| 2008/0012935 A1 | 1/2008 | Echtenkamp |
| 2008/0040780 A1 | 2/2008 | Reinhold |

FOREIGN PATENT DOCUMENTS

| | | |
|---|---|---|
| EP | 1175074 | 1/2002 |
| FR | 2600850 | 12/1987 |
| GB | 2134749 A | 8/1984 |

(56) References Cited

FOREIGN PATENT DOCUMENTS

| | | |
|---|---|---|
| JP | 5-030193 | 2/1993 |
| JP | 63-03305 A2 | 10/1994 |
| JP | 63-033054 A2 | 12/1994 |
| JP | 08077479 | 3/1996 |
| JP | 2002157627 | 4/2003 |
| WO | 96/20448 A1 | 7/1996 |
| WO | 97/22208 A2 | 6/1997 |
| WO | 98/13993 A1 | 4/1998 |
| WO | 1998023062 A1 | 5/1998 |
| WO | 00/54491 A1 | 9/2000 |
| WO | 03052741 A1 | 6/2003 |

OTHER PUBLICATIONS

Human Rights Watch, "Hong Kong: Prison Conditions in 1997", Mar. 1, 1997, pp. 48, C905, available at: http://www.refworld.org/docid/3ae6a7d014.html.
Fox, Barry M., "The First Amendment Rights of Prisoners", 1972, pp. 23, 63 J. Crim. L. Ciminology & Police Sci. 162.
Simmons, Ric, "Why 2007 is Not Like 1984: A Broader Perspective on Technology's Effect on Privacy and Fourth Amendment Jurisprudence", 2006-2007, pp. 38, 97 J. Crim. L. & Criminology 531.
TPT&TCo, "Service-Observing Arrangements Using Key Equipment for Telephone Company Business Offices, Description and Use", Bell System Practices, Station Operations Manual, 1957, Section C71.909, Issue A, 1-1-57-N.
Shields, Todd, "Prison Phones Prove Captive Market for Private Equity", Bloomberg Business, Oct. 4, 2012, pp. 5, available at: http://www.bloomberg.com/news/articles/2012-10-04/prision-phones-prove-captive-market-for-private-equity.
Segal, David, "The Phoning From Prison, at Prices Through the Roof", The New York Times, Feb. 1, 2014, pp. 4, available at: http://nytimes.com/2014/02/02/your-money/phoning-from-prison-at-prices-through-the-roof.html.
Beek, Bruno, et al., "An Assessment of the Technology of Automatic Speech Recognition for Military Applications", IEEE Transactions on Acoustics, Speech, and Signal Processing, Aug. 1977, pp. 310-322, vol. ASSP-25, No. 4.
Smith, Megan J., Correctional Agencies Receive Assistance From the Law Enforcement Analysis Facility, Corrections Today, Oct. 2001, pp. 4, vol. 63, No. 6, American Correctional Association.
Definition of "commissary," Cambridge Dictionaries Online, available at: http://dictionary.cambridge.org/dictionary/british/commissary.
Womack, Brian, "Boise dot.com aids transfers of money to prison inmates", The Idaho Business Review, Jan. 22, 2001.
Groenfeldt, Tom "CFO: The Magazine for Senior Financial Executives", Oct. 1995, pp. 97-99, vol. 11, No. 10.
Dye, Charles, "Oracle Distributed Systems," O'Reilly Media, Inc., Apr. 1, 1999.
McCollum, "Federal Prisoner Health Care Copayment Act of 2000," House of Representatives Report 106-851, 106th Congress 2d Session, Sep. 14, 2000.
Fischer, Alan D., "COPLINK nabs criminals faster," Arizona Daily Star, Jan. 7, 2001.
Wilkinson, Reginald A., "Visting in Prison," Prison and Jail Administration's Practices and Theory, 1999.
Chau, Michael, "Building an Infrastructure for Law Enforcement Information Sharing and Collaboration: Design Issues and Challenges," National Conference on Digital Government, Short Paper, 2001.
Hauck, Roslin V., "Coplink: A Case of Intelligent Analysis and Knowledge Management," Proceedings of the International Conference on Information Systems, pp. 15-28, Dec. 1999.
2 Investigative Analysis Software, "I2 Text Chart—Text Visualized," URL: http://www.i2.co.uk/Products/2TextChart/, Jun. 13, 2005.
2 Investigative Analysis Software, "I2 iBase—Information Captured," URL: http://www.i2.co.uk/Products/Base/, Jun. 13, 2005.

2 Investigative Analysis Software, "IBridge," URL: http://www.i2.co.uk/Products/iBridge/, Jun. 13, 2005.
2 Investigative Analysis Software, "Chart Reader," URL: http://www.i2.co.uk/Products/Chart_Reader/, Jun. 13, 2005.
2 Investigative Analysis Software, "Pattern Tracer," URL: http://www.i2.co.uk/Products/Pattern_Tracer/, Jun. 13, 2005.
2 Investigative Analysis Software, "Prisons," URL: http://www.i2.co.uk/Products/Prisons/default.asp, Jun. 13, 2005.
2 Investigative Analysis Software, "Setting International Standards for Investigative Analysis," URL: http://www.i2.co.uk/Products/index.htm, Jun. 13, 2005.
Microsoft, "Integrated Justice Information Systems (IJIS): An Overview," retrieved from Microsoft Justice & Public Safety Solutions website, URL: http://jps.directtaps.net/_vti_bin/owssvr.dll?Using=Default%2ehtm, Nov. 5, 2002.
Imagis Technologies Inc., "CABS—Computerized Arrest and Booking System," URL: http://www.imagistechnologies.com/Product/CABS.htm, Nov. 5, 2002.
Imagis Technologies Inc., "Integrated Justice System—Web based Image and Data Sharing," URL: http://www.imagistechnologies.com/Product/IJISFramework.htm, Nov. 5, 2002.
O'Harrow, Robert, Jr., U.S. Backs Florida's New Counterterroism Database: 'Matrix' Offers Law Agencies Faster Access to Americans' Personal Records, The Washington Post, Aug. 6, 2003, p. A.01.
O'Harrow, Robert, Jr., "Database will make tracking suspected terrorists easier," The Dallas Morning News, Aug. 5, 2003, p. 7A.
Anderson, Susan, "Three-Way Call Detect . . . Close Enough to Perfect?" Correctional Communications Quarterlv, Oct. 1993, pp. 16-20.
Bahl, L. "A Maximum Likelihood Approach to Continuous Speech Recovery," Readings in Speech Recognition, Ed. A. Waibel and K. Lee, Morqan Kaufmann Publishers, 1983, pp. 308-319, IEEE.
Batten, A. "Personal Communications Service and the Intelligent Network," British Telecommunications Enaineering, Aug. 1990, vol. 9, pp. 88-91.
DPD/120-JP Product on Display at Communications Tokyo '01, Apr. 2-5, 1991 (Product described in U.S. Pat. No. 5,218,636).
European Examination Report, EP07251570.3, dated May 29, 2008, 5 pages.
Lazervoice, Digital Recording System Inmate Services, 1997-1998, Schlumberger Technologies, Inc, / LazerVoice STIL V0222 LazerVoice User's Manual—Version 2.22, Published Apr. 28, 1998, pp. 1-41, by Schlumberqer Technologies, Inc./LazerVoice of Mobile, Alabama.
"LazerPhone Inmate Telephone System, Users Manual version 1.0," Published Oct. 1998, pp. 1-29, by Schlumberaer Technoloaies, Inc./Global Tel*Link of Mobile, Alabama.
LazerPhone, Powerful Performance Uncompromising Standards, 1998.
Lee, K., "Large-Vocabulary Speaker-Independent Continuous Speech Recognition Using HMM," Carnegie Mellon University Department of Electrical and Computer Engineering, Apr. 1988, CMU-CS-88-148.
Manual for "DPD/120-JP Dial Pulse Detection Board," Dialogic Systems Ltd., Tokyo, Japan, (Product described in U.S. Pat. No. 5,218,636), undated.
Ossgr, "Feature Specific Documents," Technical Ref. TSY-000271 FSD 85-01-0100 Calling Card Service—Published by Bell Communications Research-Revision #3, Dated Mar. 1988, vol. 3.
Ossgr, "Feature Specific Documents," Technical Ref. TSY-000271 FSD-85-01-0200 Collect Billing—Published by Bell Communications Research-Revision #3, Dated Mar. 1988, vol. 3.
PCT International Search Report, PCT/US99/09493, dated Aug. 20, 1999, 5 pages.
PCT Written Opinion, PCT/US99/09493, dated Feb. 9, 2000, 12 pages.
"PPCS (Prison Prepaid Card System)", DiaVox Technologies, Inc., Nov. 2000, 10 pages.
Scidyn Commander 3-Way Call Detection System [online], 5 paqes, [Retrieved on Jun. 20, 2006] Available at: http://www.scidvn.com/products/Commander%203-wav%20Detection.pdf.

(56) References Cited

OTHER PUBLICATIONS

"System 20" Value Added Communications (VAC), Nov. 1992, Brochure (4 pages).
Telematic "ConQuest III Inmate Telephone System," Nov. 1992.
Thermos, P., "Two Attacks Against VoIP," Security Focus, XP-002444627, pp. 1-8, Apr. 4, 2006.
"VoIP the Evolving Solution and the Evolving Threat," Internet Security Systems, Inc., XP-002444626, pp. 1-7, 2004.
IGN "Eye Toy: Chat", Published on Feb. 7, 2005. Available at: URL: http://ps2. ign.com/objects/681/681449. html>.
IGN "Eye Toy: Play 2", Published on Jan. 15, 2005. Available at: URL: http://ps2.ign.com/objects/617 /617059.html>.
European Search Report dated Apr. 4, 2008.

\* cited by examiner

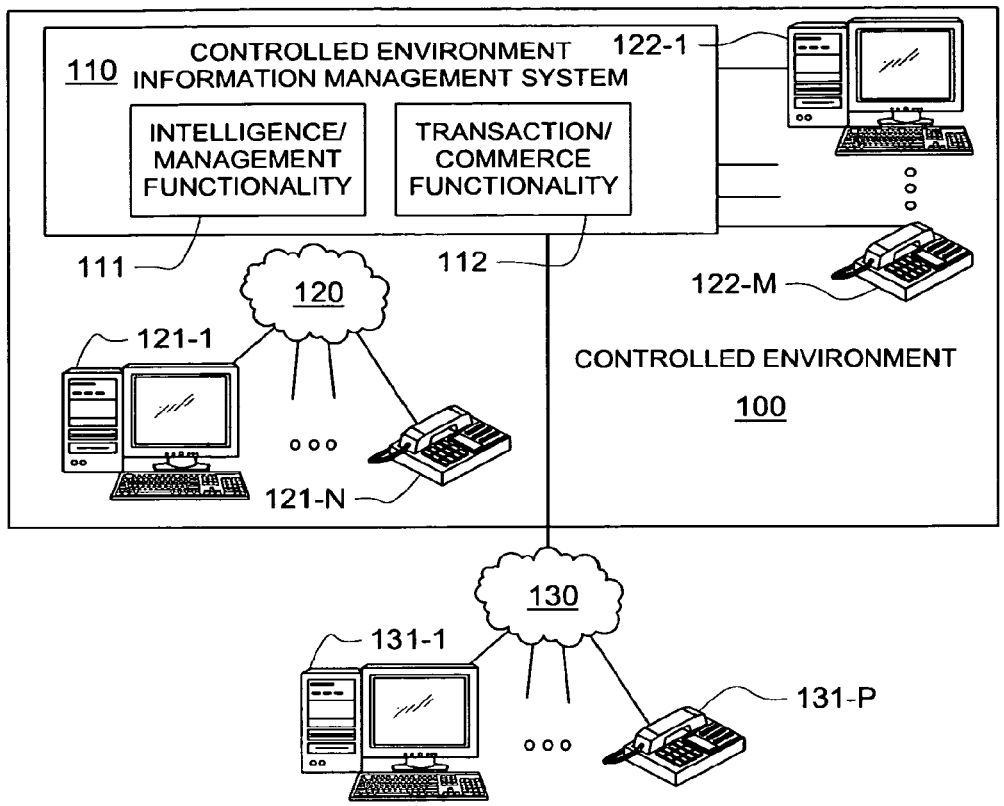
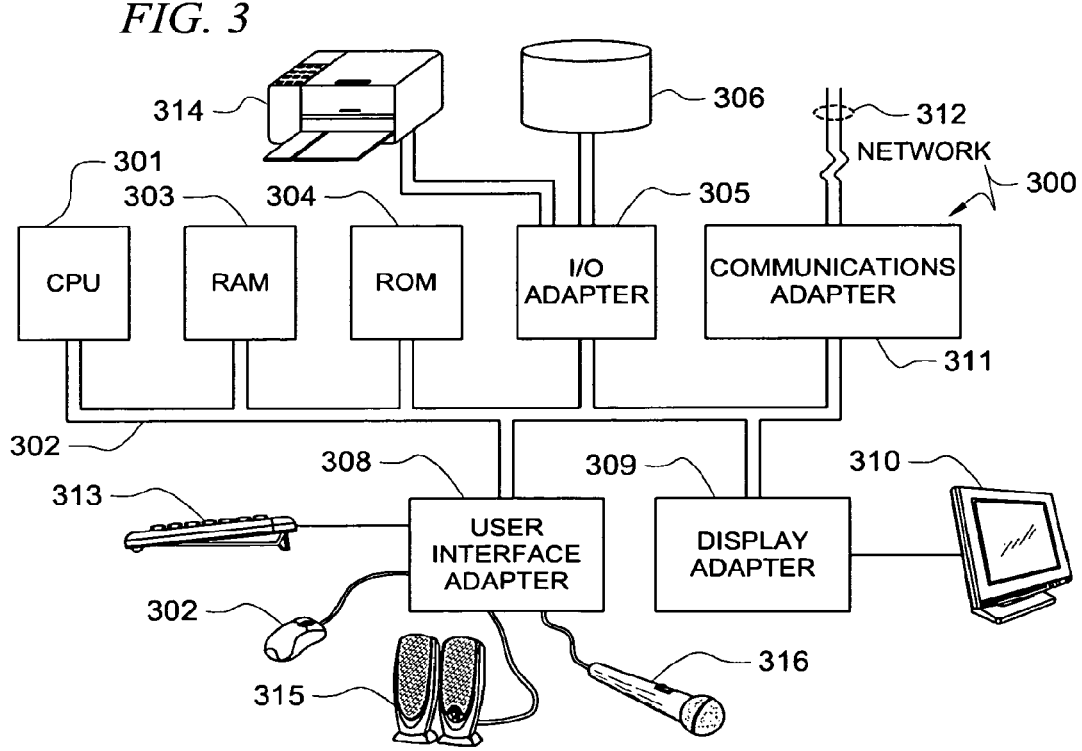

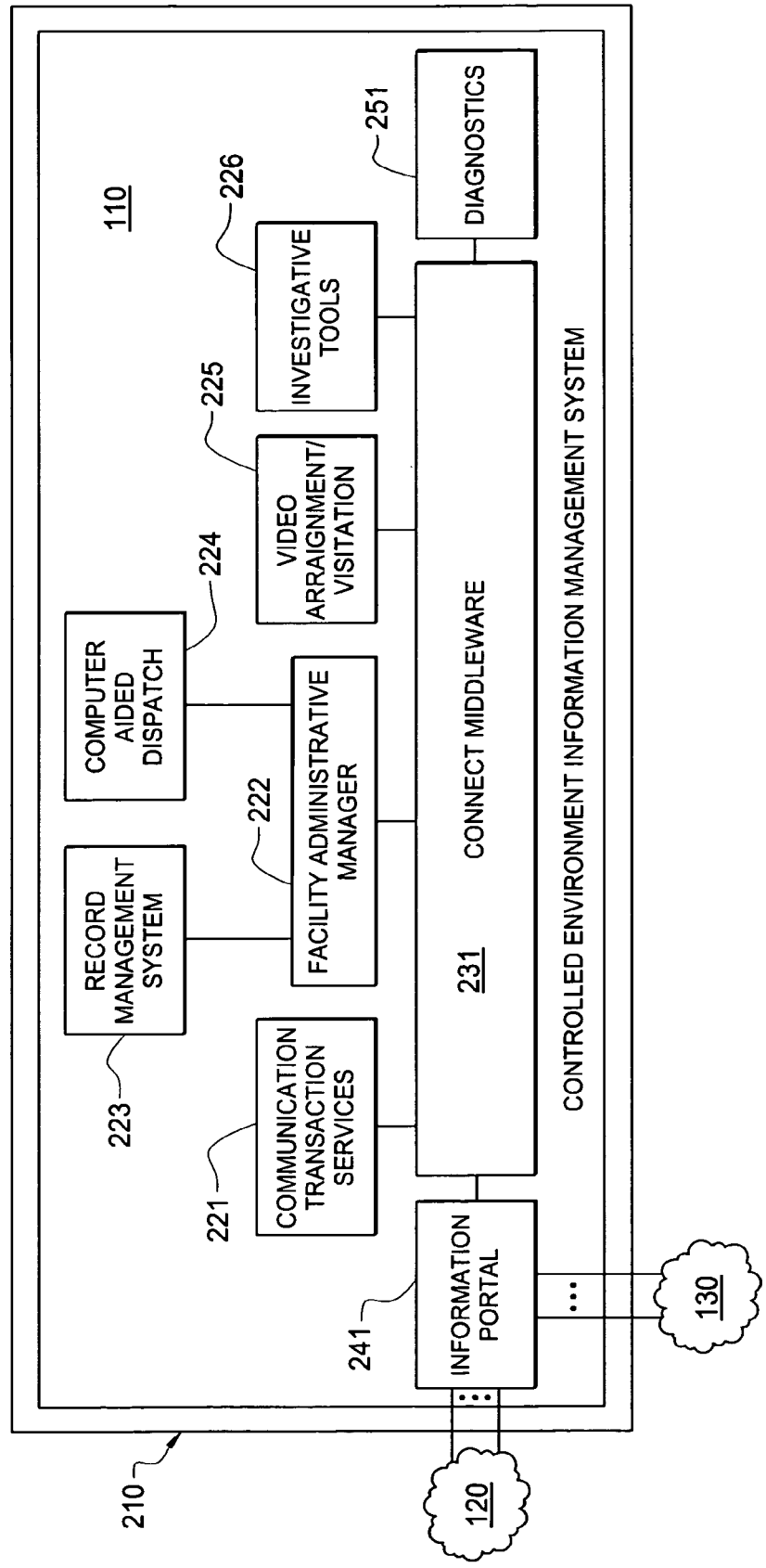

SYSTEMS AND METHODS FOR ACQUIRING, ACCESSING, AND ANALYZING INVESTIGATIVE INFORMATION

CROSS-REFERENCE TO RELATED APPLICATIONS

This is a continuation of and claims benefit of U.S. patent application Ser. No. 11/480,268, also entitled "Systems and Methods for Acquiring, Accessing, and Analyzing Investigative Information," filed Jun. 30, 2006, which itself is a continuation-in-part of U.S. patent application Ser. No. 11/182,625, filed Jul. 15, 2005, also entitled "Systems and Methods for Acquiring, Accessing, and Analyzing Investigative Information," which itself is a continuation-in-part of U.S. patent application Ser. No. 10/720,848, filed Nov. 24, 2003, entitled "Information Management and Movement System and Method," which itself is a continuation-in-part of U.S. patent application Ser. No. 10/135,878, filed Apr. 29, 2002, entitled "Information Management and Movement System and Method," to which priority is hereby claimed and which are all hereby incorporated by reference herein. The present application is related to co-pending and commonly assigned U.S. patent application Ser. No. 11/338,868 entitled "Systems and Methods for Transaction and Information Management," Ser. No. 10/720,732 entitled "Information Management and Movement System and Method," Ser. No. 09/640,831 entitled "System and Method for Reverse Billing of a Telephone Call," Ser. No. 09/640,999 entitled "System and Method for Affecting inmate Conduct With Good Behavior Discount Telephone Rates," Ser. No. 09/995,253 entitled "Method and Apparatus for Exchanging Data Between A Primary Computer System And An External Computer System To Ensure Transactional Reconciliation Between The Systems," Ser. No. 10/022,946 entitled "Method for Determining an Entity Responsible for Billing a Called Party," Ser. No. 10/252,956 entitled "Three-Way Telephone Call Prevention System and Method," Ser. No. 10/135,883 entitled "Optimizing Profitability in Business Transactions," Ser. No. 10/642,532 entitled "Centralized Call Processing," Ser. No. 10/800,473 entitled "Call Processing with Voice Over Internet Protocol Transmission," and Ser. No. 10/701,549 entitled "Systems and Methods for Cross-Hatching Biometrics With Other Identifying Data." The present application is also related to U.S. patent applications Ser. No. 11/479,990 also entitled "Systems and Methods for Acquiring, Accessing, and Analyzing investigative Information," Ser. No. 11/480,335 entitled "Systems and Methods for Multimedia Visitation," and Ser. No. 11/480,259 entitled "System and Method for Electronic Visitation Registration," each of which filed currently herewith. All of the above identified applications are hereby incorporated by reference herein.

TECHNICAL FIELD

The present invention relates generally to information systems and, more particularly, to the acquisition, access, and/or analysis of investigative information.

BACKGROUND OF THE INVENTION

Information management is becoming an increasingly critical key to the effective management of institutions and commercial enterprises. The information may relate to services, products, facilities, consumers, or staff, but it needs to be managed, moved, and accessed effectively if use of resources is to be optimized and/or profits are to be maximized.

The information needed to effectively and efficiently manage and operate a controlled environment, such as an inmate facility, may reflect the unique requirements of such a facility. There is often a need to facilitate both management of, and access to, various data with respect to a facility on a continuing basis. However, automation of management of and access to information pertaining to controlled environment facilities, and the residents therein, has been limited and integration of various different management functions has been even less prevalent.

For example, controlled environment facilities often do not have a ready means by which a new resident may be entered into (or reactivated in) a controlled environment facility management system, if such a system should happen to be in use at the facility. A police department, for example, may arrest an individual and bring that individual to a county facility for incarceration. However, entry of the individual into the controlled environment facility management system may require appreciable time, such as on the order of days. Accordingly, an investigator or other personnel may have no ability to monitor phones calls or access information regarding that individual when they are initially checked into the facility.

Moreover, there has been little, if any, interaction with respect to access of information pertaining to personal records of those confined to certain facilities. For example, due to the number and variety of systems and other sources of data used with respect to controlled environment facilities, investigators are often unable to effectively acquire, access, and analyze investigative information. An investigator may need to access a controlled environment facility management system, a gang database, a fingerprint database (e.g., an Identex machine), a public database (e.g., Public-Data.com and RapSheets.com), and/or a plurality of other separate sources of information available to the investigator in order to complete a dossier or "investigative jacket" on an individual or case. The investigator may have unique user identification and passwords to access each such separate source of information, making it inconvenient and inefficient for the investigator to access desired or useful information. Moreover, the information available from these sources of information must typically be aggregated manually by the investigator. Additional useful information may exist, such as within the controlled environment facility management system of a different controlled environment facility, which the investigator is not able to access. Accordingly, useful and perhaps critical information may elude the investigator.

The problems discussed herein are compounded when Federal, State, and municipal jurisdictions are considered. For example, it is difficult, at best, for personnel at a Federal prison facility to easily obtain information on an individual's activities with respect to misdemeanors involving a local municipality. To obtain such information, a user would have to contact the local police department as well as the local court system and perhaps even the local probation department. When domestic situations occur, or when minors are involved, the problem is even more compounded in that Family Services and/or Juvenile Services might also be involved.

Currently, technology that has been deployed uses client server technology in which applications specific to one facility, or to one function within a facility, are designed. This type of system is an isolated point of technology, and solves only one isolated issue for a limited number of users.

It is desired to share information on a technology level and to allow the approximately 50,000 desktop computers which now exist to access, on a controlled basis, that information without being constrained by the physical location of the computer and without being constrained by the enterprise affiliation of the computer.

BRIEF SUMMARY OF THE INVENTION

In one embodiment, systems and methods of the present invention provide availability of information on a network wide basis, with the network or information technology (IT) fabric spanning a wide range of institutions and other sources of information, including correctional facilities, without regard to which jurisdiction the source of information belongs, e.g. police, courts, federal investigation agencies, public databases etcetera. Embodiments of the invention provide an electronic based capability to locate, collect, compile, aggregate, distil, and/or report robust data. Preferred embodiments of the present invention not only directly identify and harvest data from the IT fabric, but also spawn extended or indirect data identification, correlation, and/or harvesting of data, such as through recognizing crossing points or confluence of information aspects.

Data located, collected, compiled, aggregated, distilled, and/or reported according to embodiments of the present invention may be utilized with respect to investigation (e.g., police investigation of crimes or suspects), credit decisions (e.g., decisions with respect to providing goods or services, such as calling service, in real-time), identification (e.g., to confirm the identity of a detainee), collection (e.g., identify parties who know an individual, to identify an individual's property, to perform skip-trace analysis, etcetera), decision making (e.g., determine if a medication should be administered), locating an individual (e.g., identifying parties who know an individual), commerce (e.g., determining a source of funding), payments (e.g., determining a proper entity to receive payment), and/or the like. For example, an investigator may utilize a system of an embodiment of the present invention to correlate information, perhaps available from a plurality of databases and/or various disparate systems (e.g., call recordings, call notes, inmate records, court records, etcetera), to compile or create an investigative jacket. Such an investigative jacket may be shared with, updated by, and/or edited by a plurality of investigators or other individuals. Accordingly, collaboration among investigators, even inter-agency collaboration, may be facilitated through the use of systems and methods of embodiments of the present invention.

An investigator may utilize systems and methods of embodiments of the invention to perform a word search, e.g., using speech to text technology (perhaps employing language translation technology), across conversations provided via a plurality of call processing systems to identify a confluence or intersection of information beyond that possible with typical investigative tools. Additionally or alternatively, an investigator may utilize such systems and methods to performing a national number search to look across a plurality of controlled environment facilities and determine if there are common telephone numbers (or other addresses, e.g., e-mail addresses, physical addresses, etcetera) contacted by residents of different controlled environment facilities. Likewise, an investigator may utilize such systems and methods of embodiments of the invention to perform a reverse lookup with respect to a telephone number (or other address, e.g., e-mail address, physical address, etcetera) a resident contacts, such as through the use of billing name and address attributes, account information, etcetera, and/or to perform background searches with respect to individuals contacted by a resident, such as to determine if the individual has a warrant outstanding, has a previous conviction, etcetera. An investigator may utilize such systems and methods of embodiments of the invention to monitor account activity (e.g., "follow the money" by tracing what household deposited money into which accounts, how much money was deposited, when the money was deposited, how that money was used, velocity of transactions using that money, etcetera) to identify a confluence or intersection of information and/or recognize a pattern beyond that possible with typical investigative tools.

An investigator or other individual's access to calling or other information according to embodiments of the invention may be real-time (during the call) and/or after the call. For example, in addition to having access to call recordings and call detail records, an investigator may be allowed to monitor a live call and/or participate in the call According to an embodiment of the invention, an investigator is able to "barge" into a call, such as to converse with one party to the call (e.g., the calling party or the called party) while blocking other parties to the call or to converse with multiple parties to the call. For example, embodiments of the present invention may monitor calls for one or more criteria (e.g., a particular called number, a particular individual making or receiving a call, a particular calling feature such as three-way calling being invoked, a particular word or phrase spoken during the call) identified by an investigator to cause a notification to be communicated to the investigator to provide the investigator an opportunity listen in on the call and to barge into the call.

An investigator or other individual may additionally or alternatively be enabled to monitor a plurality of communications (whether live or recorded) simultaneously or substantially simultaneously (e.g., using time division multiplexing). For example, an investigator or controlled environment facility personnel may utilize a call "scanner" interface to periodically step through monitoring a plurality of calls. In one embodiment, a controlled environment facility may have a plurality of telephone lines available to residents for external and/or internal (e.g., visitation) calls, wherein security personnel are desirous of monitoring each such call in real-time. Such personnel may utilize systems of the present invention to monitor each such call, for a period of time from seconds to minutes, to thereby substantially simultaneously monitor a plurality of active calls in real-time. Various of the other features described herein may be available to an individual monitoring such communications, such as to obtain translations of the communications, place bookmarks and/or comments in association with a recording of the communications, search for keywords within the communications, etcetera.

An investigator or other individual may be enabled to listen to the call in progress, himself being muted from the call (such as to prevent the calling party and/or calling party being alerted to the monitoring by background noise associated with the investigator). The investigator may be provided various controls with respect to the monitored call, such as particular dual-tone multiple frequency (DTMF) inputs to control switching from monitoring only (investigator muted) to barging into the call (investigator in duplex communication with one or more parties to the call), disconnecting the call between one or more of the parties to the call, marking positions in the call with "bookmarks" or tags for locating later in the call recording, disconnect the investigator from the call, etcetera. Various bookmarks may be defined by an investigator, such as by associating particular DTMF inputs with particular notations (e.g., threat, keyword, person of interest, investigator notation appended, etcetera). In addition to or in the alternative to such bookmarks, an investigator is enabled to append investigator notations, such as voice and/or text notes, to a recorded monitored call according to embodiments of the invention. The investigator is preferably provided with a graphical user interface to review such recorded monitored calls in order to visualize where bookmarks and/or notes are appended with respect to the monitored call.

Systems and methods of embodiments of the invention provide location, collection, compilation, aggregation, distillation, and/or reporting of information heretofore unavailable or otherwise not readily available to investigators and other individuals. For example, embodiments of the invention provide access to visitation information, such as for approving a visitor, conducting a background check of a visitor, monitoring of visitation calls, etcetera. According to an embodiment, a visitor may access a system of the present invention to schedule a visitation session, preferably inputting information personal information, such as identification, contact information, etcetera, in addition to a controlled environment facility and resident to be visited, time of visitation, etcetera, and integration provided according to embodiments of the invention utilized to identify a confluence or intersection of information, notify an investigator of the visit, provide the investigator associated information, and/or the like.

Additionally or alternatively, embodiments of the invention may facilitate acquisition of information, such as through implementing a "crime tip" or other information collection technique For example, calling systems and/or user terminals of embodiments of the invention provide a robust interface allowing a user thereof to volunteer information, perhaps when using an information management and retrieval system for another primary purpose and/or using the information management and retrieval system in a manner consistent with its use for another purpose to thereby disguise the user having provided an informational tip. An investigator may be provided the informational tip, or notification of the informational time, perhaps in association with other related or pertinent information. According to preferred embodiments of the invention, an investigator or other personnel is provided the ability to set parameters for receiving the foregoing informational tips and/or notifications regarding informational tips.

Information management and retrieval systems of the present invention may be deployed for use with respect to a variety of controlled environment facilities, including inmate facilities (e.g., municipal jails, county jails, state prisons, federal prisons, military stockades, juvenile facilities, and detention camps), hospitals, nursing homes, camps, and the like. For example, information management and retrieval systems of the present invention may be disposed within such a controlled environment facility, or disposed remotely thereto having operator (user) terminals disposed within each of the different facilities and/or external thereto, to provide information management, movement and access uniquely suited for use with respect to such an environment. Additionally, information management and retrieval systems of the present invention may be coupled to other systems, whether internal or external to the controlled environment facility, including networks (such as the public switched telephone network (PSTN) and the Internet), databases (such as demographic databases, consumer account databases, historical records databases, government databases, and judicial databases), and platforms (such as personal computers, computer networks, and even other information management systems of the present invention). It should be appreciated, however, that aspects of the present invention are useful without regard to controlled environment facilities, and therefore there is no limitation to use of embodiments of the present invention with respect to controlled environment facilities.

A peer to peer arrangement may be used according to embodiments of the invention, such that all available information is assigned a security level and/or sharing group and then becomes accessible to anyone having the designated security level and/or sharing group designation. The security level could, if desired, be associated with a peer level. Also, the user could not only access the data specific to a particular file (for example, an individual), but could also access any associated data files or other databases recognized by the system as containing useful information, whether locally or remotely maintained. Additionally or alternatively, a net-centric or centralized arrangement, such as where centralized servers and/or databases are shared among a number of facilities, agencies, etcetera, may be utilized according to embodiments of the invention. The foregoing security levels may be implemented with respect to data stored or otherwise managed by such centralized systems to control access to data specific to a particular file (for example, an individual) or other facilities, agencies, etcetera which is recognized by the system as containing useful information.

These "additional" files, could be manually populated data files or could be associative files which track particular transactions or other information associated with a particular file, such as a file of who an individual represented by a selected file has called within the last month, or year, or the "additional" file could be a list of relatives, or a list of goods purchased, some, or all, of these lists could be maintained in databases located remote both from the user and from the target database and may be compiled and/or updated automatically, such as through operation of information management systems of the present invention. The "additional" files may be identified using the aforementioned analysis techniques.

In a further embodiment, information management and retrieval systems of the present invention are used to facilitate information exchange and interaction among individuals and agencies. For example, chat rooms, bulletin boards and other features which allow users at various facilities within a community of interest to exchange concepts may be implemented according to embodiments of the invention.

One preferred embodiment utilizes an information management and retrieval system comprising intelligence/management functionality and transaction/commerce functionality to provide interoperability across a variety of controlled environment functions. For example, a preferred embodiment provides interoperability of such facility management functions as facility administration, record management, dispatching of personnel, to efficiently utilize resources as well as to provide seamless movement and availability of data throughout these functional aspects. Additionally, functionality unique to the particular controlled environment facility, such as video arraignment, video visitation, investigation, and the like, may be provided interoperability according to the present invention. Preferably, transaction and commerce functionality, such as marketing of goods and services to residents or individuals having an interest in the residents, ordering of goods and services by residents or individuals having an interest in the residents, sales of goods and services by vendors, and payment for goods and services through prepaid and postpaid techniques, with account establishment and debit/credit functionality, is provided interoperability with management functions, or aspects thereof, according to the present invention.

Preferred embodiment information management systems and methods provide connectivity and functionality both within the controlled environment facility and outside the controlled environment facility, such as through the use of an information portal providing real-time information communication through a variety of media and according to various protocols. For example, management, staff, and residents within the controlled environment facility may be provided interfaces for accessing particular functional aspects available to the individual. Likewise, individuals and/or commercial enterprises having some interest in the controlled environment facility, or the residents thereof, may be provided interfaces for accessing particular functional aspects of the system. Such individuals and commercial enterprises may include friends and family of residents, vendors, government agencies (e.g., judicial officials, law enforcement officials, and other local, state, and federal agencies), providers of services to residents (e.g., doctors, clergymen, attorneys, bail bondsmen, and counselors), and individuals with a connection to the facility or its residents (e.g., voters in the county and victims of a crime committed by a resident).

The interfaces provided according to the present invention may be varied depending upon the individual given access and/or the functionality available to the individual. Accordingly, a manager may be given access to the information management system via computer systems (local and/or remote) personal digital assistants (PDAs), pagers, and telephones (wireline and/or wireless), to facilitate input of data, querying of data, notification of events or conditions, management of the facility, receiving reports, etcetera. However, a resident of the controlled environment facility may be given access to the information management system via a wireline telephone only, to thereby restrict the resident to making outbound calls (which may be restricted by operation of the information management system in time, duration, destination, content, etcetera) and/or the acquisition of particular goods available to residents. Similarly, vendors may be given access to the information management system via a remote computer system and/or telephone (wireline and/or wireless) to receive orders from the facility, verify accounts or status of payment, and coordinate delivery of goods and services.

Access to and/or collection of data by information management systems of the present invention may utilize biometrics, such as voice print, finger print, iris and/or retina scan, hand scan, face and/or personal physical attribute recognition, and the like. Accordingly, one or more of the above identified user terminal devices may be equipped with biometric interfaces for use in collection appropriate biometric data for use in verifying a user, collecting biometric data for storage by the information management system, for authorizing a transaction or transactions, etcetera.

Embodiments of the invention provide data access not only to facility administration and personnel, but also to persons disposed remotely, even in the field, such as police on the streets. In one embodiment, a web browser is used at any number of user locations to gain access, by the user, to data contained in databases maintained in association with any number of facilities or other sources of information, thereby providing anytime, anywhere access to robust data. Interactive "web pages" may be provided to a user via a web browser which conveniently provides access to a number of tools useful to particular users. For example, one embodiment provides an investigator "dashboard" configuration allowing users identified as investigators to access and view investigator tools. A browser interface utilized according to embodiments of the invention provides a user friendly front end which seamlessly presents relevant information to users, irrespective of the sources, systems, databases, or combinations thereof from which it is obtained. Preferably browser interfaces utilized according the present invention are multimedia capable to facilitate presentation of text data, e.g. inmate records, audio data, e.g., recordings of inmate phone calls, and video data, e.g., photographs and streaming video.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 shows a block diagram of a controlled environment information management system deployed according to a preferred embodiment of the present invention;

FIG. 2 shows a block diagram of an integrated controlled environment information management architecture according to a preferred embodiment of the present invention;

FIG. 3 shows a processor based system adapted to provide controlled environment information management according to an embodiment of the present invention;

DETAILED DESCRIPTION OF THE INVENTION

Figure 4:
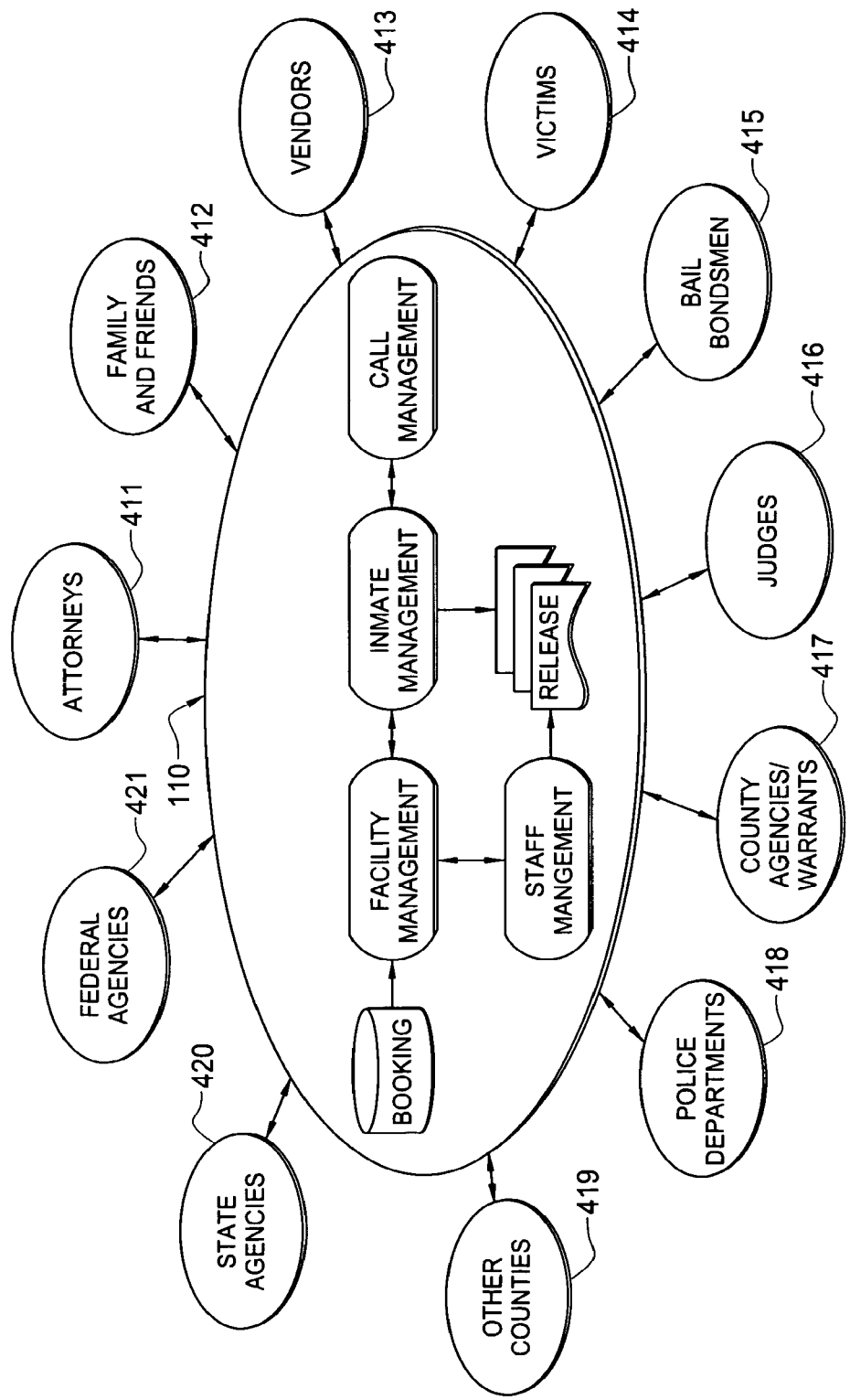
FIG. 4 shows an illustration of the flow of information through a controlled environment information management system, such as that of FIGS. 1 and 2, deployed with respect to an inmate facility.

Controlled environment facilities, such as inmate facilities, hospitals, nursing homes, and camps, may be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests (hereinafter referred to as residents), and a number of individuals and enterprises indirectly associated therewith, including friends and family of residents, vendors, government agencies, providers of services to residents, and individuals with a connection to the facility or its residents. Information is often exchanged and transactions are often conducted by, between, among, and on behalf of the aforementioned individuals and enterprises in performing the aforementioned daily activities.

It shall be appreciated that in such a controlled environment, there may be unique relationships, situations, and information which may be leveraged in providing management functions, in conducting transactions, or in locating, collecting, compiling, aggregating, distilling, and/or reporting information. For example, information flowing from residents may be monitored and/or processed in an intelligence area to ensure the safety and security of those within the controlled environment facility and those outside of the facility. Moreover, information with respect to individuals and/or enterprises having an interest in residents of the controlled environment facility may be utilized in facilitating transactions, such as toll telephone calls and the purchase of commissary items. Accordingly, preferred embodiments of the present invention provide integration of various functional aspects associated with a controlled environment facility to provide a robust information movement and management platform.

Directing attention to FIG. 1, a controlled environment information management system of the present invention is shown according to an embodiment to provide integrated management and movement of information and transaction and commerce facilitation within and associated with a controlled environment facility. Specifically, controlled environment information management system 110 is deployed within controlled environment facility 100. Although illustrated as being deployed within the controlled environment facility in FIG. 1, it should be appreciated that controlled environment information management systems of the present invention may be deployed in a number of configurations. For example, embodiments of the present invention provide an information management system deployed external to the controlled environment facility and having data terminals and/or other access points deployed within the controlled environment facility, as shown and described in the above referenced patent applications entitled "Centralized Call Processing" and "Call Processing with Voice Over Internet Protocol Transmission." Additionally or alternatively, information management systems may be provided in a distributed topology, such as having server systems, application programs, and/or databases distributed throughout a number of geographic locals, according to embodiments of the present invention.

As shown in FIG. 1, information management system 110 may provide a number of access points coupled to a variety of user terminal equipment configurations. User terminal equipment utilized according to preferred embodiments of the present invention may include personal computers, personal digital assistants (PDAs), pagers, telephones (wireline and wireless), facsimile machines, kiosks, automatic teller machines (ATMs), and the like, coupled through direct links, such as wireline, cable, fiber optic, etcetera, and/or indirect links, such as network links, private branch exchange (PBX) links, etcetera. Accordingly, information management system 110 of the illustrated embodiment provides connectivity to user terminals 122-1 through 122-M disposed within controlled environment facility 100 via direct connections, user terminals 121-1 through 121-N disposed within controlled environment facility 100 via indirect connections (here comprising network or networks 120, referred to herein as network 120), and user terminals 131-1 through 131-P disposed external to controlled environment facility 100 via indirect connections (here comprising XML connections and/or network or networks 130, referred to herein as network 130).

Various ones of user terminal equipment utilized according to the present invention may be configured to include the ability to collect biometric data, such as through the use of fingerprint readers, hand scanners, cameras, microphones, iris and/or retina scanners, and/or the like. For example, a personal computer, PDA, and/or telephone terminal utilized according to the present invention may be equipped with a camera, whether still or moving image, to capture an image of a user's face or other physical attribute. It should be appreciated that the aforementioned camera (and similarly, microphones) utilized at various user terminals for collection of biometric data may itself not be uniquely adapted for biometric data processing and, therefore, may be readily available for use according to the present invention. However, systems of the present invention, whether user terminals or information management systems, preferably include adaptation such as computer program code, for collecting, processing, and/or storing biometric data as described herein. User terminals may additionally or alternatively be equipped with a more specialized form of biometric interface, such as a fingerprint reader or iris scanner, utilized exclusively for the collection of biometric data. Captured biometric data may be processed, such as described in the above referenced patent application entitled "Systems and Methods for Cross-Hatching Biometrics With Other Identifying Data," to verify the identity of the user, such as to allow access to data or services or to authorize a transaction, or the biometric data may be collected for storage by the information management system, such as to supplement a database entry associated with the user. It should be appreciated that collected biometric data may be processed locally by a user terminal, such as to verify the identity of a user for authorizing further interaction, or may be processed by the information management system, such as by receiving raw biometric data from a user terminal and providing processing thereof to supply a result code to the user terminal.

In accordance with the preferred embodiment of the present invention, controlled environment information management system 110 is adapted to include intelligence/management functionality 111 and transaction/commerce functionality 112. Preferably, intelligence/management functionality 111 provides for processing, collection, storage, and movement of information for managing various operational aspects of the controlled environment facility, including the management of personnel, residents, vendors, and resources. Transaction/commerce functionality 112 preferably provides for the instigation and completion of various transactions, including requesting and providing goods and services, determining credit worthiness, verifying account balance and status, and providing for payment. The aforementioned functionality is preferably provided according to the present invention at any distance and at any time.

Directing attention to FIG. 2, a preferred embodiment integrated architecture of an information management system of the present invention is shown. Specifically, information management system 110 is shown as including a plurality of vertical applications and modules useful therewith, including communication/transaction services 221, facility administration manager 222, record management system 223, computer aided dispatch 224, video arraignment/visitation 225, and investigative tools 226, providing features and functions for providing desired management and transactions. Each of these vertical applications and modules may provide features and functions desirable with respect to the controlled environment facility.

For example, communication/transaction services 221 may provide distance telephony, prepaid and postpaid toll calling services, telephonic commerce, account balance verification and refill, and credit worthiness determination as may be utilized by residents, friends and family thereof, and vendors. It should be appreciated that the communications and transactions facilitated by communication/transaction services 221 are not limited to any particular type or format of communications or transactions. For example, communication/transaction services 221 may facilitate voice and/or video communications, such as plain old telephone services (POTS), voice over Internet protocol (VoIP) communications, and multi-media communications, as well as other forms of communications, including e-mail, short message service (SMS), alpha-numeric paging, etcetera.

Facility administration manager 222 may provide management of residents from entry into the facility to release therefrom, management of facility staff and resources, and data querying and reporting. Embodiments of the present invention implement facility administration manager 222 to enter information associated with a resident of a facility and facility personnel into information management system 110. For example, upon admittance of a resident into a facility, facility administration manager 222 may be utilized to enter resident information, thereby establishing a record associated with the resident, creating a user account, issuing a user personal identification number (PIN), obtaining biometric samples, creating a list of permitted calling numbers/addresses, etcetera. Such information is preferably utilized to populate data fields/records associated with various vertical applications of information management system 110, thereby providing a unified point of entry for various systems and functions. For example, information communication may be provided by closely coupled vertical applications (e.g., using direct, perhaps proprietary, interfaces) and/or through the use of open architecture interfaces (e.g., using an extensible markup language (XML) to provide self describing, open system communications).

Information communication provided according to embodiments of the invention provides for transfer of data or automated population of appropriate data fields, where data associated with an individual is available to information management system 110. For example, a police department may utilize an associated information management system or a centralized information management system to book an individual into a municipal jail. That individual may later be transferred to a county or state facility, having an information management system associated therewith which is in communication with the police department's information management system or which is also using a centralized information management system. Accordingly, personnel at the country or state facility may not be required to input any or all the information associated with the individual.

The aforementioned creation of a user account and issuing a PIN is provided substantially immediately upon entry of the appropriate information according to embodiments of the invention to facilitate tracking of residents from the moment they are admitted to a facility. For example, upon booking of an individual into a municipal jail, a user account may be created and a PIN issued to the individual prior to them being placed in a detention cell. Thereafter, the individual may utilize the PIN in order to access transaction/commerce functionality 112 of information management system 110 in order to place a free phone call, such as to notify friends/family of their incarceration, to solicit legal assistance, etcetera. The ability to create a user account and issue a PIN as an individual is admitted into a facility provides heretofore unavailable opportunities to collect investigative information. For example, research has shown that calls made early in an individual's incarceration tend to be rich with investigative information, such as information on crimes committed, persons involved in the crimes, etcetera. Accordingly, such calls may be recorded, monitored, word searched, and/or the like to provide an investigator valuable information that might otherwise have been lost. Moreover, creating a user account and issuing a PIN as an individual is admitted into a facility provides administrative advantages, such as limiting the number of free calls made by an individual and providing proof that an individual was provided with a free call as may be required by law.

Record management system 223 may provide storage, access, management, and/or maintenance of databases comprising information with respect to residents, staff, resources, and transactions. Computer aided dispatch may provide assignment, allocation, and/or dispatching of resources and personnel. Video arraignment/visitation 225 may provide multimedia communication, as may be useful in providing visitation by remote parties and/or making remote appearances by a resident.

Investigative tools 226 may provide collection, processing, analysis, and/or reporting of information for intelligence purposes investigation tools 226 of a preferred embodiment provides tools such as word search, language translation (whether machine translation or access to translation services), call (whether terminated external to the controlled environment facility or internally thereto) recording, call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration as described herein. Integration implemented according to embodiments of the present invention facilitates various of the foregoing features of investigative tools 226.

Figure 7:
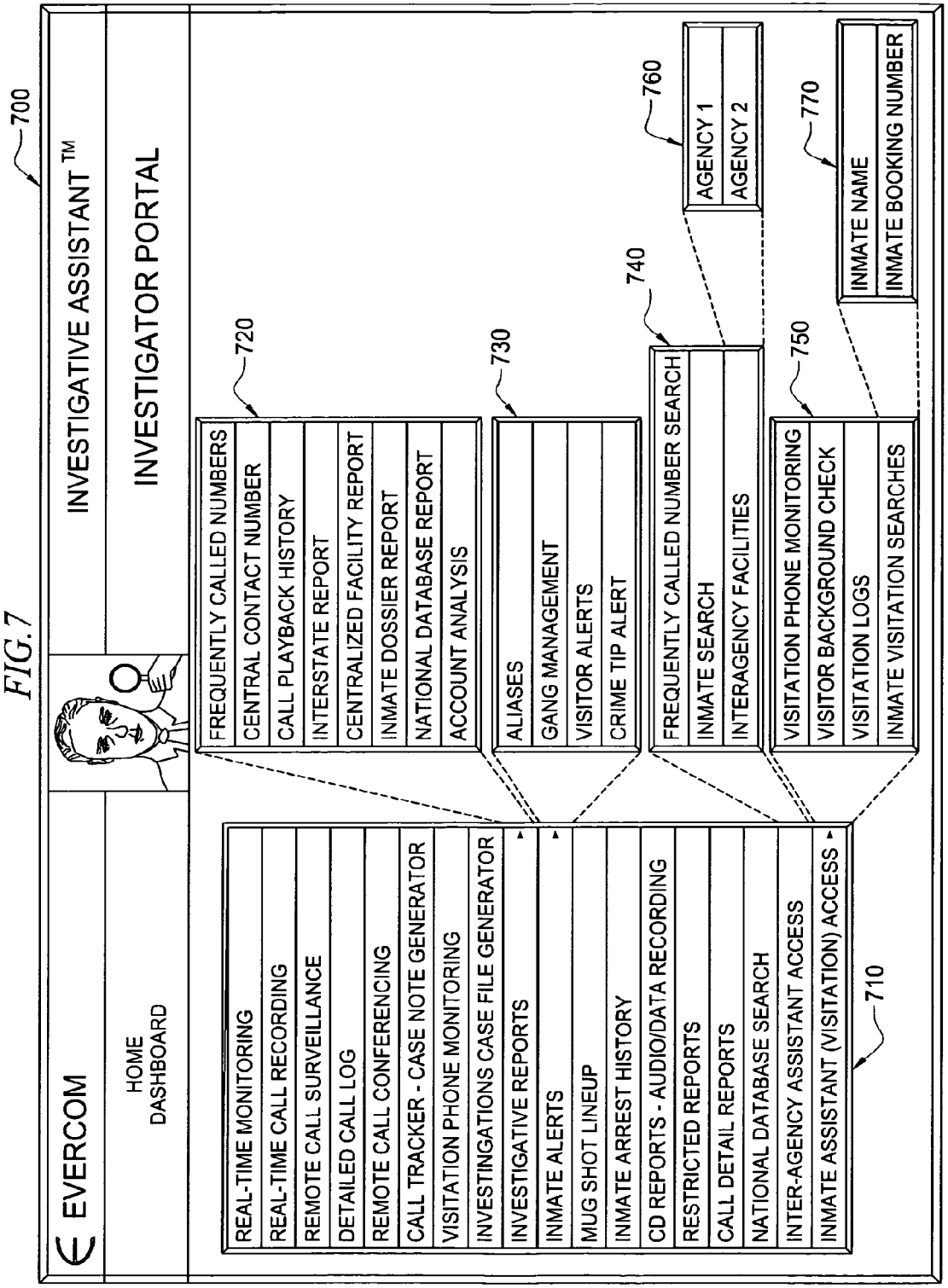
FIG. 7 shows an embodiment of a user interface presenting and facilitating selection of various investigative tools according to an embodiment of the invention.

The foregoing investigative tools are preferably provided through an intuitive user interface to provide ease of use, facilitate operation across a variety of user terminals, and/or to facilitate remote access to one or more features thereof. For example, embodiments of the invention use a web page having menus comprising an investigator dashboard, such as shown in FIG. 7 described below, to present and facilitate selection of various investigative tools as described herein.

Any or all of the vertical applications above may, in addition to providing the aforementioned core functionality thereof, also provide functionality useful according to embodiments of the present invention, such as biometric data processing/user verification, user data collection, and/or the like. For example, communication/transaction services 221 may provide personal identification number (PIN), personal access number (PAN), and/or biometric security with respect to voice, video, and e-mail communications. The features and functions provided by vertical applications and modules of a preferred embodiment as deployed with respect to an exemplary controlled environment facility is discussed in further detail below.

Also shown in the integrated architecture of FIG. 2 is a layer, connect middle-ware 231, providing interconnection with respect to vertical applications and modules 221-226. According to the preferred embodiment, connect middle-ware 231 provides voice, video and/or data integration among and between the aforementioned vertical applications and modules. For example, connect middle-ware 231 may utilize a plurality of modular interfaces, such as application program interfaces (APIs) as are well known in the art, to arbitrate data communication between and among vertical applications and modules 221-226. Connect middle-ware 231 preferably provides for modular interconnection with respect to various applications to thereby facilitate addition of applications as desired and/or configuring the information management system for use with respect to particular facilities.

As described above, preferred embodiments of information management systems of the present invention provide connectivity, such as to a variety of user terminal equipment and/or a plurality of information management systems of the present invention, both within and outside of an associated controlled environment facility. Accordingly, connect middle-ware 231 of the illustrated embodiment is coupled to information portal 241. Information portal 241 provides external connectivity with respect the vertical applications and modules and/or other aspects of the information management system. For example, information portal 241 may provide information communication between any of vertical applications and modules 221-226 and users thereof, via connect middle-ware 231 and network 120, network 130, or any of a number of other links. Information portal 241 may facilitate such functionality as voice, e-mail, and/or video conferencing, information and dossier sharing via a network such as the Internet, alert broadcasts, and/or the like.

It should be appreciated that a plurality of communication lines and/or wireless communication links, such as the public switched telephone network (PSTN), cellular networks, personal communication services (PCS) networks, the Internet, cable transmission systems, satellite communication systems, electrically conductive transmission lines, fiber optic links, local area networks (LANs), metropolitan area networks (MANs), wide area networks (WANs), intranets, extranets, and the like, may be utilized in providing information communication according to the present invention. A user might access one or more aspects of information management system 110 via information portal 241 using an interface, such as a browser configuration well known in the art. Similarly, information management system 110, or systems or users thereof, may access resources external thereto, such as other information management systems, external data bases and servers, user terminals, etcetera, via information portal 241.

In addition to providing the aforementioned connectivity, information portal 241 of the preferred embodiment provides additional functionality related to information communication. For example, information portal 241 may provide for the collection of real-time call statistics. Similarly, information portal 241 may capture information related to a call or communication, such as automatic number identification (ANI) information, dialed number identification service (DNIS) information, communication routing information, information useful in determining call accounting records, commissions, or other related financial information, and the like. Additionally, information portal 241 is not limited to telephony communication and, therefore, may provide a data firewall, e-mail management, packet or other Internet destination routing, or like functionality useful with respect to data communication.

The integrated architecture of the illustrated embodiment further includes diagnostics 251. Preferably, diagnostics 251 provides real-time diagnostic monitoring with respect to software and hardware aspects of the information management system. Accordingly, diagnostics 251 of the illustrated embodiment is coupled to connect middle-ware 231 to facilitate interaction with software and hardware aspects of information management system 110. Moreover, the diagnostic capabilities of diagnostics 251 are preferably available remotely and, therefore, the illustrated embodiment of diagnostics 251 is coupled to information portal 241 via connect middle-ware 231. In operation, diagnostics 251 may monitor operation of information management system 110 to detect anomalous or undesired behavior, such as failure of a hardware component, excessive errors in a communication link, application software error codes, attacks upon system security, and the like, and provide warnings or alarms to operators or service personnel, such as by issuing an e-mail communication or initiating a phone call or pager alert. Similarly, diagnostics 251 may analyze operation with respect to resources of information management system 110, such as available storage space, utilization of communications ports, processing speed, etceteras, to thereby predict undesired behavior for preemptive action. Preferred embodiment diagnostics 251, therefore, operates to minimize the risk of loss of information and the amount of down-time associated with use of information management system 110.

In addition to providing the aforementioned notification of particular conditions, diagnostics 251 preferably provides a user interface, such as using a browser configuration as is well known in the art, to allow an operator to access diagnostics 251 from a remote user terminal for such purposes as performing diagnostics and configuring diagnostics 251. Accordingly, an operator may be located anywhere in the world and access diagnostics 251, via information portal 241, and explore operational aspects of various components, such as circuit cards and application programs.

Referring still to FIG. 2, applications platform 210 of the illustrated embodiment serves as the base on which the integrated architecture of information management system 110 may be constructed as desired. For example, when implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etceteras. The computer data signal may include any signal that can propagate over a transmission medium such as electronic network channels, optical fibers, air, electromagnetic, RF links, etceteras. The code segments may be downloaded via computer networks such as the Internet, an intranet, etcetera.

FIG. 3 illustrates computer system 300 adapted to use the present invention, such as may correspond to platform 210 shown in FIG. 2. Central processing unit (CPU) 301 is coupled to system bus 302. The CPU 301 may be any general purpose CPU, such as a processor from the Intel PENTIUM processor family, or a Motorola POWERPC processor. However, the present invention is not restricted by the architecture of CPU 301 as long as CPU 301 supports the inventive operations as described herein. Computer system 300 may be operating under control of an operating system such as Microsoft WINDOWS NT, or other release of the WINDOWS operating system, UNIX, LINUX, and the like.

Bus 302 of computer system 300 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art. Bus 302 is also coupled to input/output (I/O) controller card 305, communications adapter card 311, user interface card 308, and display card 309. The I/O adapter card 305 connects to storage devices 306, such as one or more of a hard drive, a CD drive, a floppy disk drive, a tape drive, to the computer system. The I/O adapter 305 is also connected to printer 314, which would allow the system to print paper copies of information such as document, photographs, articles, etcetera Note that the printer may a printer (e.g. dot matrix, laser, etceteras), a facsimile machine, or a copier machine. Communications card 311 is adapted to couple the computer system 300 to a network 312, which may be one or more of a telephone network, a LAN, a MAN, a WAN, the Internet, and/or the like. User interface card 308 couples user input devices, such as keyboard 313, pointing device 307, and microphone 316, to the computer system 300. User interface card 308 also provides sound output to a user via speaker(s) 315. The display card 309 is driven by CPU 301 to control the display on display device 310.

Having broadly described a controlled environment information management system according to a preferred embodiment of the present invention, deployment and operation thereof will be described with respect to an exemplary controlled environment facility to better aid the reader in understanding the concepts of the present invention. Specifically, deployment and operation of information management system 110 with respect to an inmate facility, e.g., a prison, is described below. Accordingly, aspects of information management system 110 as may be particularly adapted for use in an inmate facility is described. However, it should be appreciated that the present invention is not limited to the particular exemplary features and functionality described herein.

Referring now to FIG. 4, information management system 110 is deployed in association with one or more inmate facilities and provides management of various aspects thereof, such as facility management (including tracking residents (inmates) from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate management (including managing inmate information and tracking inmate activity). Information management system 110 as deployed in the embodiment of FIG. 4 further facilitates communications between a plurality of different individuals and/or groups 411-421. Such groups may include attorneys 411, friends and family 412, vendors 413, victims 414, bail bondsmen 415, judges 416, county agencies 417, police departments 418, other counties 419, states agencies 420, and/or federal agencies 421. Of course, the individuals and/or groups for which communications are facilitated are not limited to those illustrated in FIG. 4 and may include any number of sources and/or destinations for data, including individuals and entities of different countries, various businesses and business types, non-profit organizations, clubs and social groups, law making bodies, etcetera.

Figure 5A:
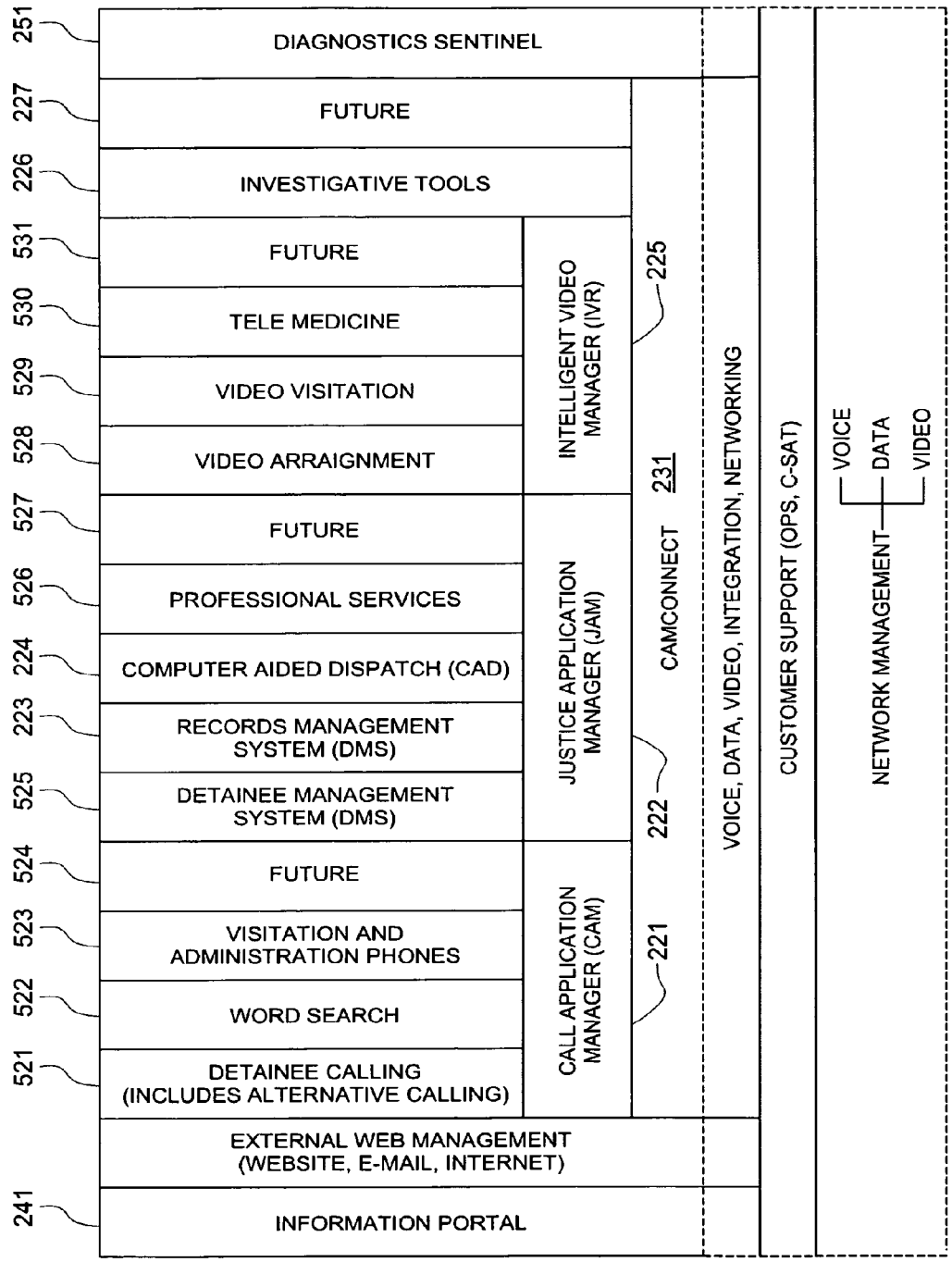
FIG. 5A shows a block diagram of an integrated controlled environment information management architecture adapted for use with respect to an inmate facility according to a preferred embodiment of the present invention.

Directing attention to FIG. 5A, adaptation of information management system 110 of FIGS. 1 and 2 to provide features and functionality specifically useful with respect to an inmate facility is shown. Specifically, although operable substantially as described above, communication/transaction services 221 (here identified as a call application manager) has modules specifically adapted for use in inmate facilities associated therewith, including detainee calling 521, word search 522, and visitation and administration phones 523. Similarly, facility administration manager 222 (here identified as justice application manager) has modules specifically adapted for use in inmate facilities associated therewith, including detainee management system 525 and professional services 526, in addition to the aforementioned records management system 223 and computer aided dispatch 224. Video arraignment/visitation 225 (here identified as intelligent video manager) also has modules specifically adapted for use in inmate facilities associated therewith, including video arraignment 528, video visitation 529, and tele-medicine 530.

It should be appreciated that the information management system of the preferred embodiment is readily adaptable for use in various situations, as evidenced by information management system 110 of FIG. A. Moreover, information management systems of the present invention are preferably expandable, upgradable, scalable, and configurable. For example, additional or alternative vertical applications and/or modules may be provided to information management system 110, as represented by future modules 524, 527, and 531 and future vertical application 227. Similarly, functionality such as shown and described in the above referenced patent applications entitled "System and Method for Reverse Billing of a Telephone Call," "System and Method for Affecting Inmate Conduct With Good Behavior Discount Telephone Rates," "Method and Apparatus for Exchanging Data Between A Primary Computer System And An External Computer System To Ensure Transactional Reconciliation Between The Systems," "Method for Determining an Entity Responsible for Billing a Called Party," "Three-Way Telephone Call Prevention System and Method," and "Optimizing Profitability in Business Transactions" may be incorporated into an information management system of the present invention, if desired.

Operation of information management system 110, and the aforementioned vertical applications and modules, with respect to the exemplary inmate facility preferably provides functionality in at least two particular areas. The primary areas of functionality provided according to the exemplary embodiment include justice intelligence/management and distance commerce.

Justice intelligence/management preferably provides for safety and security and ensures that the inmates, although they are incarcerated, are not committing or otherwise involved in additional crimes or other undesired activity. Justice intelligence/management may additionally or alternatively provide such functionality as managing the incarceration of the inmate, intelligence gathering/analysis, and management of facility personnel and resources. Accordingly, justice intelligence/management according to the preferred embodiment involves technology that is integrated within the facility (such as one or more of vertical applications and modules 221-226 and 521-531, connect middleware 231, information portal 241, network 120, and user terminals 121-1 through 121-N and 122-1 through 122-M) and outside the walls of the facility (such as network 130 and user terminals 131-1 through 131-P).

According to one aspect of the exemplary justice intelligence/management functionality, life of the inmates are managed from booking through release. Accordingly, facility administration manager 222, record management system 223, and detainee management system 525 may be implemented to facilitate booking of a new inmate, allowing input of an inmate's records, perhaps including data collected in the booking process such as identification photographs, handwriting and/or voice exemplars or other biometric data, one time while populating data fields for use by various aspects of the invention. Such information may be input into the system in a number of ways, including the use of keyboard, telephonic, PDA, kiosk, touch screen, voice, biometric data scanner, etcetera. This information may be utilized, supplemented, and/or revised by a variety of other applications or modules, such as aforementioned communication/transaction services 221, computer aided dispatch 224, video arraignment/visitation 225, and investigative tools 226.

Records management system 223 in cooperation with facility administration manager 222 preferably ensures the completion of fields of information desired for the proper management with respect to the inmate. For example, input of medical information and medical profiles may be solicited to ensure the proper administration of medications or physical therapy. Moreover, records management system 223 preferably provides for event tracking to ensure the proper activities have been performed, such as the dispensation of the aforementioned medications or physical therapy. Additional information accepted by facility administration manager 222 and/or tracked by record management system 223 may include gang affiliations (such as may be determined from the inmate's clothing and body art or the individuals to which the inmate places phone calls or receives visits), outstanding warrants and previous arrests (such as may be determined from communication with other government agencies etcetera via information portal 241), and contacts outside of the facility (such as may be determined from monitoring phone numbers dialed through communication/transaction services 221 or the individuals from which the inmate receives visits). Of course, other information for use in managing the incarceration of the inmate and/or in an intelligence gathering/analysis role may be collected, processed, and/or managed according to the present invention.

Preferably, information collected and managed according to the present invention is made available real-time to those systems, enterprises, and individuals requiring such information. For example, information portal 241 operating in cooperation with record management system 223 may allow an individual, preferably after having cleared security protocols such as using biometric data, personal identification numbers, etcetera, to look at information with respect to the operation of the facility (such as to review revenues, current staffing and resource utilization, current resident population, and the like) and/or information with respect to residents thereof (such as information with respect to booking a particular inmate, the gang affiliation of a particular inmate, statistical information of inmates, the address of a friend or family member of a particular inmate, and the like). Additionally or alternatively, information portal 241 may allow members of the general public, such as individuals who live in and around the inmate facility, to access information on the facility or various individuals, such as information as it relates to sex offenders who might live in the community. According to a preferred embodiment, information portal 241 operates with respect to a browser interface for accessing such information.

According to another aspect of the exemplary justice intelligence/management functionality, computer aided dispatch 224 is provided to allow guards, patrol officers, investigators, and the like to lookup information about inmates and/or to facilitate the deployment of resources and personnel as needed. Accordingly, computer aided dispatch 224 of the exemplary embodiment integrates not only with facility administration manager 222 (such as for personnel availability from time and attendance records) and record management system 223 (such as for information with respect to particular inmates), but also with, in the case of a sheriff's department, for example, their on-street force so that the patrol officers can in fact look up information about inmates and investigators can share information with the patrol officers.

A further aspect of the exemplary justice intelligence/management functionality provides for enhanced access at any distance through video arraignment/visitation 225. For example, individuals disposed remotely with respect to the facility may be given virtual visitation access to an inmate using video visitation 529. Similarly, an inmate may be given virtual access to particular events and venues, such as court appearances and arraignment proceedings using video arraignment 528 and/or tele-medicine 530. Moreover, using integration with respect to such aspects as facility administration manager 222 and/or record management 223, information with respect to the inmate may be made available to the attorney and judge.

A still further aspect of the exemplary justice intelligence/management functionality provides justice intelligence through investigative tools 226. Communication/transaction services 221, utilized in providing telephone calling from and to inmates, and video arraignment/visitation 225, utilized in providing visitation of inmates by friends and family, may provide detailed information with respect to an inmate, his activities, and those be associates with and facility administration manager 222 may collect detailed information with respect to an inmate and their activities. Accordingly, information management system 110 of the preferred embodiment has access to very rich investigative information. For example, from analyzing calls placed through communication/transaction services 221, it may be known who is making a call, who is the called party, and the content of the call may even be monitored and/or recorded. Investigative tools 226 may log all the calls so that an investigator may research them through an archive. Additionally or alternatively, investigative tools 226 may be provided access to internal and/or external criminal databases and/or other sources of useful information.

Investigative tools 226 are preferably utilized not only to directly identify and harvest data from such internal and external databases, but also to spawn extended or indirect data identification, correlation, and/or harvesting of data, such as through recognizing crossing points or confluence of information aspects and initiating database hops for exploring additional, e.g., related or relevant, data. The databases from which such data is harvested may be unrelated (e.g., a calling services database, a commissary services database, and an inmate records database, all associated with a same facility or different facilities, which include disjoint information). Integration implemented according to embodiments of the present invention facilitates harvesting and generation of rich investigative information by investigative tools 226.

For example, a tip (e.g., crime tip feature of investigative tools 226 may be integrated with communication transaction services 221 to facilitate a resident of controlled environment facility 100 (or other individuals, such as friends and family etcetera) volunteering information, perhaps anonymously According to embodiments of the invention, a resident may provide information constituting a tip when using controlled environment information management system 110 for another primary purpose, to thereby avoid the resident being identified as an informant. Additionally or alternatively, a resident may use controlled environment information management system 110 in a manner consistent with its use for another purpose (e.g., telephone calling, commissary ordering, etcetera) to thereby disguise the user having provided an informational tip. For example, the resident may be provided with a special (e.g., "dummy") tip telephone number, wherein the resident uses controlled environment information management system 110 as if a telephone call is being placed but, rather than being connected to a friend or family, the resident may be placed in communication with a tip receiving function of the system (e.g., interactive voice response (IVR) platform and recorder functionality as may be provided by investigative tools 226). Similarly, the resident may use one or more special or dummy commissary items, quantities, etcetera (e.g., while placing an actual or factious commissary order using controlled environment information management system 110) to provide tip information in a manner unlikely to be detected by other residents of the controlled environment facility.

Investigative tools 226 may provide the tip, or notification of the tip, to an investigator in real-time by transmitting a SMS message, an electronic mail message, placing an outbound call, presenting an audio and/or graphic announcement at a user terminal, etcetera) or not in real-time (e.g., providing a notification during a next user session of investigative tools 226, playing a message during a next telephone interaction with controlled environment information management system 110, etcetera). According to one embodiment, such an alert or a communiqué is provided to an investigator through investigative tools 226 and/or communication transaction services 221. The investigator may utilize the alert to retrieve one or more tips arid/or information associated therewith.

According to preferred embodiments of the invention, an investigator or other personnel is provided the ability to set parameters for receiving the foregoing informational tips and/or notifications regarding informational tips. For example, an investigator may provide residents with special or dummy telephone numbers (e.g., selected or created by the investigator in detainee calling 521) used by controlled environment information management system 110 for receiving tips. The investigator may establish a particular telephone number for a particular individual (e.g., to identify the tipping individual although the individual otherwise provides the tip anonymously), for a particular case or particular crime (e.g., to organize and manage the tips received), etcetera. Moreover, an investigator may establish criteria for receiving alerts with respect to tips. For example, an investigator may establish settings (e.g., in investigative tools 226) to receive alerts based upon a particular number dialed with respect to a tip, a particular individual leaving a tip, a particular individual, keyword, etcetera identified in a tip, a particular crime associated with a tip, a number of tips received exceeding a particular threshold, a time of day or day of week to issue an alert with respect to all new tips received, and/or the like.

The investigator is preferably provided additional related or otherwise pertinent information in association with the foregoing tips, such as by presenting information about a party which is a subject of or otherwise associated with the tip (e.g., dossier, recordings of one or more calls, information with respect to an account, persons known to be contacts or friends and family, etcetera). Using the aforementioned capabilities providing location, collection, compilation, aggregation, distillation, and/or reporting of robust data, robust information on a person associated with the tip (e.g., the person who is leaving the tip, if they identify themselves or if they use a PIN number to be able to use the telephone, and/or whoever the tip is reporting) may be provided to the investigator. According to embodiments of the invention, the investigator is provided the ability to look up useful information, such as an individual associated with the tip, jail booking information, etcetera. Moreover, because of the tight integration of the features and functions described herein according to embodiments of the invention, information provided to an investigator in association with a tip may include recordings of phone calls or visitations (e.g., recent calls, calls between parties identified in the tip, calls having one or more keyword in common with the tip, etcetera), information with respect to accounts and account activities, and/or other information available from otherwise separate functions.

Embodiments of investigative tools 226 provide access to visitation information to an investigator and/or other personnel, such as for approving a visitor, conducting a background check of a visitor, monitoring of visitation calls, etcetera. For example, an individual who wants to visit a resident of controlled environment 100 may set up a visitation appointment using facility administration manager 222 and/or communication transaction services 221 prior to traveling to the controlled environment facility, such as shown and described in the above referenced patent application entitled "System and Method for Electronic Visitation Registration." In doing so, such individuals may provide information with respect to themselves, such as identification (e.g., name, drivers license number, social security number, PIN, etcetera), contact information (e.g., telephone number, electronic mail address, physical address, etcetera), account information (e.g., credit card information, pre-paid account information, etcetera), and/or the like, in order to facilitate the visitation session Additionally or alternatively, such individuals may provide information such as identification of a controlled environment facility and resident to be visited, time and/or day of visitation, etcetera. Investigative tools 226 of embodiments of the invention may thus provide an investigator with information regarding who is planning to come into the controlled environment facility and when, background information on the individual, information with respect to previous visits, etcetera.

Embodiments of the invention preferably provide robust information with respect to visitation, such as identifying confluence or intersection of information to identify other residents who have called and/or visited with this individual, if any monies have been deposited to accounts by this individual, any patterns or behaviors correlating to visits or other activities by this individual, etcetera. Investigative tools 226 may provide the visitation information, or notification of the visitation information, to an investigator in real-time (e.g., by transmitting a SMS message, an electronic mail message, placing an outbound call, presenting an audio and/or graphic announcement at a user terminal, etcetera) or not in real-time (e.g., providing a notification during a next user session of investigative tools 226, playing a message during a next telephone interaction with controlled environment information management system 110, etcetera).

Investigative tools 226 of embodiments of the invention provide access to transaction and/or account information. In operation according to a preferred embodiment, investigative tools 226 interacts with other functions of controlled environment facility information management system 110 to monitor, process, and/or compile information with respect to transactions and information processed using controlled environment facility information management system 110. For example, an individual may deposit funds for or on behalf of a resident of controlled environment facility 100, such as using distant deposit techniques show and described in the above referenced patent application entitled "Systems and Methods for Transaction and Information Management." Communication transaction services 221 and investigative tools 226 may cooperate to derive information with respect to what household deposited money for a particular resident, what goods and services that resident ordered, and generate various reports about usage of the system by individuals. Such information may be provided to an investigator using investigative tools 226 for analysis, and perhaps appropriate action. The investigator may thus have visibility into money coming into and out of the controlled environment facility, who is providing and using the monies, what goods and services are acquired using the monies, etcetera. Investigators may establish thresholds to provide an alert if, for example, a certain amount of money comes and/or goes out over a time period, in a particular transaction (e.g., deposit or purchase), in a particular account, in association with a particular individual and/or facility, etcetera. Moreover, analysis according to embodiments of the present invention may identify a confluence or intersection of information based on the movement and/or the spending patterns of the money in one or more accounts that could indicate some form of activity that the investigator might want to look into.

Investigative tools 226 of embodiments enable an investigator to monitor a plurality of communications simultaneously or substantially simultaneously (e.g., using time division multiplexing). For example, a 100 bed controlled environment facility may provide resources to support 10 simultaneous communications (e.g., calls to external parties, visitation sessions, and/or the like) by residents thereof. It may not be practical to provide personnel to monitor each such communication and/or the full content of each such communication, whether in real-time or subsequent to the completion of the communication. However, one or more personnel (i.e., less that the total number of simultaneous communications) may be available for monitoring such communications Accordingly, such personnel (e.g., an investigator) may utilize a communications "scanner" interface of investigative tools 226 to step through monitoring a plurality of communications, whether in real-time while the communications are transpiring or not in real-time, such as from recordings of the communications. Such personnel may utilize systems of the present invention to monitor each such call, for a period of time from seconds to minutes as may be user definable and/or adjustable, to thereby substantially simultaneously monitor a plurality of communications.

For example, an investigator may define how many seconds or minutes to play content of each communication before stepping to a next communication for playing content thereof. Such times may be variable or varied depending upon circumstances or other parameters. In one embodiment, a monitor window (e.g., 30 seconds) is established for serially monitoring each communication of a plurality of active communications. However, if a keyword is detected (e.g., using automated word search functionality) in a communication (whether the currently monitored communication or one of the active communications which is not currently being monitored in the window), the monitor window for that communication may be extended (e.g., by an additional 15 seconds). Similarly, although it is expected that each active (or otherwise selected) communication will be monitored in a round-robin fashion, various communications may be presented in a monitoring window out of order, such as based upon circumstances or other parameters. For example, if a keyword is identified in a communication which is not currently being monitored in the window, the window with respect to the currently monitored communication may be terminated in favor of opening a monitoring window with respect to the communication in which the keyword was detected.

Additionally or alternatively, the investigator monitoring the communications may manually hold a monitoring window open with respect to a communication of interest, prematurely close a monitoring window, open a monitoring window with respect to a particular communication, etcetera. For example, an investigator may manipulate a "scan" control interface (e.g., button or soft button) to move from a currently monitored communication to a next communication in a round robin sequence.

An investigator or other monitoring personnel may be provided with controls in addition to or in the alternative to the aforementioned scan control capabilities. For example, an investigator may be enabled to place bookmarks and comments, as described herein, with respect to the monitored communications. Other features and functions as described herein, such as translations, keyword searching, alerting, etcetera, may be provided with respect to monitoring a plurality of communications according to embodiments of the invention.

Additional information may be provided to an investigator or other personnel with or in association with the content of the monitored communications, if desired For example, investigative tools 226 may facilitate an investigator selecting a dossier, background check, reverse phone number lookup, or other information described herein, for one or both of the parties to the communication.

Embodiments of investigative tools 226 may facilitate translation of communications. For example, a user interface of investigative tools 226 may include a "hot link" or other control feature to allow an investigator to request and receive a translation of a communication or portion thereof. According to one embodiment, an investigator may select the aforementioned hot link to transmit a communication, or a selected portion of a communication, to a translation service (e.g., a presubscribed translation service which is standing by to provide translation services). Such a service may have staff, preferably fluent in a variety of languages, standing by to receive such communications and provide translations thereof, whether in audio or text, perhaps in real-time or near real-time. For example, translation services may be provided during live monitoring of the communication, much like closed captioning is provided with respect to live television broadcasts. Additionally or alternatively, embodiments of the invention implement automated translation algorithms to facilitate desired translations, whether in audio or text, in real-time or near real-time.

In operation according to embodiments of the invention, validation or security protocols are employed with respect to some or all of the translation services. For example, where the communication is to be provided to an external translation service, an investigator or other personnel attempting to invoke the translation service may be validated to confirm that this person has authorization to monitor the communication, to obtain a translation, and/or to cause the communication to be relayed outside of controlled environment facility information management system 110. As but one example, the resident being monitored may be receiving and/or discussing health care, perhaps causing federal health insurance portability and accountability act (HIPAA) or other privacy laws to apply, thus requiring certain protections with respect to the privacy of the communication to be implemented. Similarly, inmates in a prison typically have privacy laws controlling the use of their communications. Validation protocols implemented according to embodiments of the invention can be configured to comply with such privacy laws and to otherwise protect the privacy of communications. For example, because the investigator or other personnel requesting the translation is validated, embodiments of the invention may operate to associate the translation request with that individual, as opposed to any individual which is a party to the communication. As such, staff of the translation service may not have any visibility into the parties to the communication, the facility associated with the communication, etcetera. It may be advantageous, however, to provide some information with respect to the communication, such as identifying the communication as a medical communication, a social conversation, etcetera, in order to provide a context useful in accurately translating the communication.

Validation used with respect to translation services provided by embodiments of the invention may be implemented using an interim operator, whether robotic or live. For example, when an investigator selects a hot link for translation of a selected communication, an interim operator (e.g., a live operator or IVR unit) may be placed in communication with the investigator to validate the investigator, preferably by identifying the investigator and confirming that the investigator has the authority to obtain the requested service, identification may be obtained through the use of a PIN, social security number, employee number, name, etcetera. Moreover, identification, or perhaps validation of the identification, may be provided through the presentation of biometric information, radio frequency identification (RFID), barcode, and/or the like, such as through the use of a scanner or other input at a user terminal.

It should be appreciated that the aforementioned provision of security and/or protection of privacy may not be implemented with respect to all requested translation services according to embodiments of the invention. For example, communications which are not subject to privacy issues may be provided translation services without the forgoing validation of the requesting personnel being employed according to embodiments. Moreover, translation services provided by machine translation algorithms, and thus which are not exposed external to controlled environment facility information management system 110, may be employed without validation of the requesting personnel according to embodiments of the invention. However, embodiments of the invention employ validation with respect to personnel requesting any translation services in order to provide a layer of security, such as may be in addition to the personnel having already been validated in order to access an overlying feature such as monitoring, etcetera.

Figure 5B:
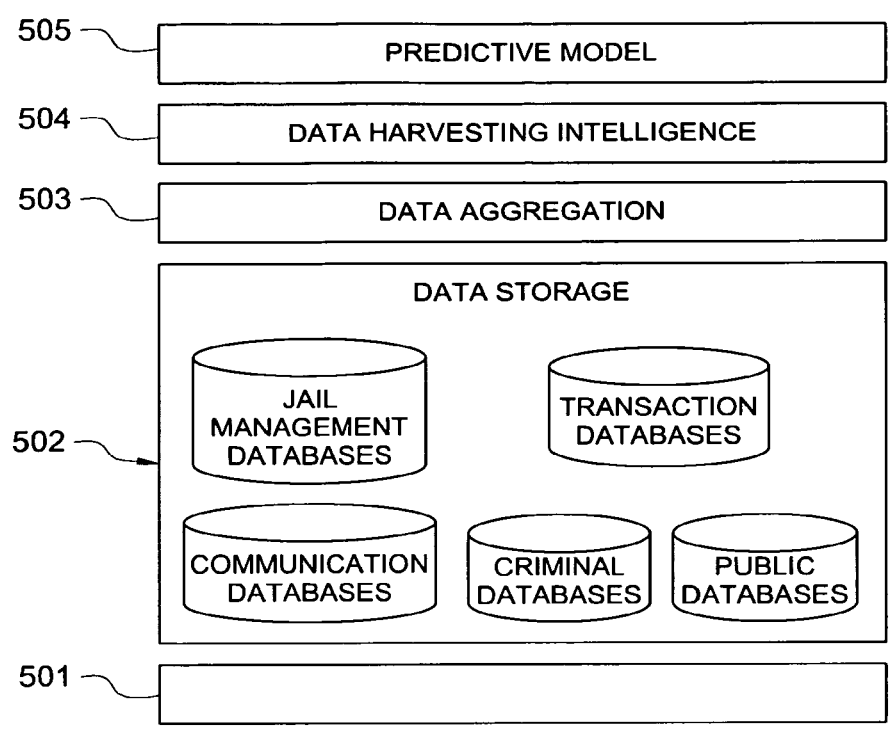
FIG. 5B shows a graphical representation of a data framework utilized according to an embodiment of an integrated controlled environment information management architecture of the present invention.

FIG. 5B shows a graphical representation of the data framework provided according to one embodiment using information management system 110 of FIG. 5A. In the data framework of FIG. 5B, one or more of information management system 110 gather data (shown as data gathering 501), such as using call application manager 221, justice application manager 222, and/or intelligent video manager 225 to collect, compile, and collate data passing through information management system 110 or otherwise available thereto. Data, including that which is gathered by information management system 110 and that which is otherwise available to information management system 110, may be stored (shown as data storage 502) in any of a number of databases, such as jail management databases (e.g., associated with justice application manager 222), communication and/or transaction databases (e.g., associated with call application manager 221), criminal databases (e.g., associated with governmental entities such as the FBI), public databases (e.g., associated with various public and/or governmental entities), and/or the like. One level of data processing by information management system 110 may provide data aggregation (shown as data aggregation 503), such as by parsing information relevant to individuals, events, locations, etcetera to provide data associations (e.g., compile dossiers, event timelines, etcetera). Another level of data processing by information management system 110 may provide data harvesting and database hopping (shown as data harvesting intelligence 504), such as by utilizing multi-dimensional, multi-informational vectors to directly identify and harvest data from the IT fabric, as well as to spawn extended or indirect data identification, correlation, and/or harvesting of data through recognizing crossing points or confluence of such vectors and initiating database hops for exploring additional data. A still further level of data processing by information management system 110 may provide artificial intelligence and predictive modeling (shown as predictive model 505), such as by applying fuzzy logic to recognize trends, similarities, correspondence, and/or other indirect links between otherwise independent information.

Investigative tools 226 may utilize speech to text technology, such as employed within word search 522, to monitor a call (including voice over internet protocol (VoIP) and plain old telephone service (POTS) calls) and/or video conference, preferably in real-time, for the presence of particular words or phrases. Similarly, investigative tools 226 may utilize word search 522 to monitor an e-mail and/or postal mail (such as may be converted to electronic format using optical scanner technology), preferably in real-time, for the presence of particular words or phrases. Such words or phrases may be those generally worrisome with respect to an inmate population, such as gun, bomb, and kill, or may be words or phrases identified as having importance with respect to a particular inmate, such as the name of a gang, the name of a sentencing judge in combination with threatening words, or the name of a victim. A facility may implement a personalized or customized dictionary for use at that facility or with respect to particular inmates to detect particular words, such as local colloquialisms or slang commonly utilized in the area, if desired. When such words or phrases are detected, investigative tools 226 may page, or otherwise contact, an associated investigator to alert him to the situation. The investigator may be connected to the call real-time to allow him to listen to the conversation and/or a recording of the call may be provided to the investigator for further analysis. Additionally or alternatively, the investigator may be provided with a dossier or other information on the particular individual or individuals to the communication.

According to an embodiment of the invention, an investigator is able to control various aspects of the call and/or the monitoring thereof, such as to disconnect one or more parties from the call, to "bookmark" a position in the call, to "barge" into the call in order to speak to one or more of the parties to the call, etcetera. For example, an investigator may "barge" into a call, such as to converse with one party to the call (e.g., the calling party or the called party) while blocking other parties to the call or to converse with multiple parties to the call. The investigator may listen to a call after having been notified that the call met one or more criteria and, perhaps after monitoring the conversation to determine that the call is associated with some form of undesired communication, elect to barge into the call (e.g., by pressing a DTMF key such as "#" or "*" or by other signaling methods). Similar signaling may be used by the investigator to disconnect the call, to disconnect the investigator's leg of the call, to transfer and/or conference the monitoring leg of the call to another investigator or other destination, to record notes about the call, and/or the like.

Additionally or alternatively, an investigator may utilize a computer or other data processing system to determine that a call of interest is in progress or has been recorded. For example, an investigator may view a web page on a web browser which shows calls of potential interest (e.g., calls from/to particular individuals, calls in which particular words or phrases have been uttered, calls from/to particular phone numbers or other addresses, calls associated with a particular facility, etcetera) which are transpiring or which have transpired, allowing the investigator to select a call to listen to and/or to barge into.

An investigator may be notified of a particular call or be connected to a particular call as a result of the aforementioned word search capability. However, additional or alternative triggers may be implemented to notify or connect an investigator. For example, criteria such as the placing of a call to a particular called number, a particular individual placing or receiving a call, a particular calling feature such as three-way calling being invoked, a velocity of calls (i.e., number of calls per period of time) to a particular called number or by a particular individual exceeding a threshold or sharply increasing may be monitored or analyzed in order to trigger a notification to an investigator to provide the investigator an opportunity to barge into the call. Rather than providing a notification to an investigator, embodiments of the invention may operate to automatically connect the investigator to the call, e.g., by placing a call to the investigator's office phone, cell phone, multi-media computer, or other device(s) selected by the investigator, perhaps preceded by a message announcing that the call is a real-time monitoring event and providing relevant information (e.g., identification of one or more parties to the call, identification of the facility associated with the call, identification of the trigger instigating the call monitoring, etcetera). Moreover, the monitoring event may be established automatically, such as upon connection of the investigator to the call, without awaiting signaling from the investigator.

An investigator may be enabled to barge into a call originated by a resident of a facility to an individual outside of the facility, a call originated by an individual outside of a facility to a resident of a facility, a visitation call conducted within the facility, etcetera. When baring into the call, the investigator may block one party to the call in order to converse with the other party to the call. For example, an investigator pressing a DTMF "#" key may signal a system of an embodiment of the present invention to block the called party and establish communications between the investigator and the calling party. For example, pressing the "#" key may place the investigator in full duplex communication with a calling party and block the called party (perhaps playing an announcement to inform the called party that the call has been blocked). Similarly, an investigator pressing a DTMF "*" key may signal a system of an embodiment of the present invention to block the calling party and establish communication between the investigator and the called party. For example, pressing the "*" key may place the investigator in full duplex communication with a called party and block the calling party (perhaps playing an announcement to inform the calling party that the call has been blocked). Additionally or alternatively, systems of embodiments of the invention are able to identify a party which is the subject of an investigator's attention, such as by PIN identification used to initiate the call, facilitating blocking of the other party and establishing communication between the investigator and the appropriate party without the investigator knowing whether the target was the calling or the called party.

Where an investigator wishes to communicate with multiple parties to the call, a key or key sequence may be provided to control such communications. For example, pressing both the "#" and "*" keys may place the investigator in full duplex communication with a calling and called party.

Call control provided to the investigator according to embodiments of the invention may additionally or alternatively control functionality other than communication duplexing. For example, while monitoring a call an investigator may wish to "bookmark" a particular location in the call, such as when a particular word was spoken or when particular subject matter is being discussed, to readily locate content of interest in a recording of the call Accordingly, the investigator may press one or more DTMF key, or implement another signaling method, to place a bookmark at the current location. Various different bookmarks, such as DTMF "1", "2", etcetera, may be used within a call or calls to group or relate content, to place bookmarks indicative of different points of interest in the call, etcetera.

An investigator may be enabled to provide notes in association with a call. For example, an investigator may speak or otherwise input notes, perhaps after providing a control signal to indicate notes are to be recorded, during monitoring of a call while muted from the calling and called parties. Similarly, an investigator may speak or otherwise input notes, perhaps after providing a control signal to indicate notes are to be recorded, after the investigator has disconnected from the call or after the call has been terminated.

As an exemplary embodiment, a DTMF "1" may place a bookmark indicative of a threat being made, referenced, alluded to, etcetera, a DTMF "2" may place a bookmark indicative of a particular keyword of interest having been spoken, a DTMF "3" may place a bookmark indicative of a person of interest having been mentioned, referenced, spoken, etcetera, a DTMF "4" may place a bookmark indicative of an investigator's notation (e.g., audio, textual, and/or graphical information that the investigator wishes to associated with the call at a designated point) being appended to the call, etcetera. Of course, the foregoing are merely exemplary of signaling which may be used in placing bookmarks and the various meanings which may be associated with such bookmarks.

It should be appreciated that the foregoing bookmarks may be placed by an investigator or other personnel while monitoring a call in real-time, whether having barged into the call or monitoring the call while being muted from the calling and called party, or while reviewing a recording of a monitored call. For example, if monitoring a recorded call, an investigator may provide signaling, such as using the foregoing DTMF tones, to the controlled environment information management system, or portions thereof, while the call is played back to place bookmarks and notes at or in association with appropriate points in the call. Replay of the recorded monitored call may be suspended during entry of such signaling and/or investigator notes in order to allow the investigator to hear the entire call. For example, if the investigator signals that an investigator's notation is to be appended to the call, the playback of the call may be suspended while the investigator speaks a message, or otherwise inputs desired notation information.

If monitoring a call in real-time while being muted, an investigator may similarly provide signaling, such as using the foregoing DTMF tones, while listening to the call without the calling and called party hearing such signaling. Moreover, the investigator may input the contents of an investigator's notation without the calling and called party hearing such input, although perhaps the investigator may miss a portion of the call during such input due to his attention being focused on inputting information. Embodiments of the invention implement real-time recording to facilitate pausing the call as heard by the investigator during input of such information and continuing with quasi real-time playback thereafter. Additionally or alternatively, embodiments of the invention allow an investigator to use short signaling pulses, such as the aforementioned DTMF tones, during real-time call monitoring, allowing the investigator to supplement the input thereafter, such as to input the content of an investigator's notation at a position marked with a DTMF "4" after the call has been completed (e.g., the calling and called party release the line).

If monitoring a call in real-time while barging into the call (e.g., the investigator is not being muted with respect to one or more of the calling and called parties), an investigator may still provide signaling such as using the foregoing DTMF tones, while listening to the call without the calling and called party healing such signaling For example, functionality of the controlled environment information management system may filter such signaling from the stream ultimately provided to the calling and/or called party. The foregoing filtering may be with respect to predefined signals, such as DTMF tones, and/or may be with respect to other signals and/or information. For example, an investigator may provide a DTMF "4" to indicate that investigator's notations are to be appended to the call recording causing the investigator's voice to be filtered from the calling and/or called party during audio input of a notation message by the investigator. Such muting may continue for a predetermined amount of time determined sufficient to allow input of a notation or may be controlled by the investigator, such as by input of a signal (e.g., second input of a DTMF "4").

According to embodiments of the invention, an IVR provides a menu after an investigator has disconnected from a call in order to facilitate various functions, such as the aforementioned appending of notes. Such a menu may facilitate functions such as the investigator obtaining of receiving reports with call details, a bookmarked call recording, the investigators notes, etcetera. The foregoing reports may be communicated to the investigator electronically, such as by electronic mail, or by other means. Moreover, the reports may be provided to other investigators, groups of investigators, etcetera.

Although embodiments have been described above with reference to signaling being provided in-band with respect to a call (e.g., DTMF tones and voice), signaling may be provided out of band, whether by a separate link or out of band on a call link. For example, when an investigator is notified of a call of interest, the investigator may not only be coupled to the call by an audio link for monitoring the call, but may also be provided with a user interface for providing information, control, etcetera, such as may be provided by the investigator dashboard described below. An embodiment of the invention provides a graphical user interface, such as via a web page, allowing an investigator to provide signaling, such as the aforementioned bookmark signals and investigator's notations, and/or provides information regarding the call to the investigator, such as information regarding the calling and/or calling parties, the controlled environment facility, the call itself (e.g., duration, originating and/or terminating numbers, etcetera), and/or the like. Such a user interface is described further below with reference to the investigator dashboard of an embodiment of the invention. The information and control user interface and audio link may be provided by separate user terminals (e.g., a web page accessed via computer whereas the audio link is provided by a POTS line) or may be provided by the same user terminal (e.g., a multimedia computer providing both an audio reproduction of a call and access to an information and control web page).

Although the above embodiments have been described with reference to calls, it should be appreciated that an investigator may be enabled to barge into communications in addition to or in the alternative to calls. For example, video communications and electronic mail communications may be monitored for providing listening and/or barging capabilities to an investigator. Likewise, notifications provided to an investigator according to embodiments of the present invention are not limited to calls. For example, an investigator may establish criteria for a notification of when a particular individual receives a visitor or a visit from a particular individual. Moreover, such notifications need not be associated with a real-time event, such as a call or visitation. For example, an investigator may be notified when a particular individual is added to a resident's visitation list, although the actual visitation will not occur until sometime in the future. An investigator may utilize such information for approving/disapproving a visitor, conducting a background check of a visitor, scheduling monitoring of visitation calls, etcetera. Accordingly, one or more investigators may be provided the ability to check all visitors coming in to a facility, facilitating their making arrests of criminals that visit other criminals, contacting individuals wanted for questioning, etcetera.

Investigative tools 226 may similarly monitor other aspects of an inmate's activities for use in an intelligence role. For example, the fact that a call was placed by a particular inmate to a particular known associate may indicate that a criminal act is likely being contemplated, thereby providing a predictive model for investigative reporting. Similarly, broadcast alerts may be provided to particular individuals upon the occurrence of a predetermined trigger, such as a particular event. According to one embodiment, a subscription process is proved for creating alerts, receiving dossier updates or update notices (e.g., via email), receiving notice or the content of a communication when an identified individual is involved in the communication (e.g., phone bridge in real time during a call or receiving a recording of a call), etcetera.

The use of predictive models using investigative tools 226 of embodiments of the present invention may analyze or identify patterns of various individuals, such as through use of calling information, purchasing information, e-mail and/or postal mail communications, known associates, known physical attributes (e.g., presence and content of tattoos, hair style, apparel color and style), addresses and/or areas known to particular individuals, particular key words from communications, and/or other information available to an information management system of the present invention, to identify a list of potential suspects for a particular investigation. For example, an investigator may input as many details as are known about a crime, such as a gang affiliation of a victim, a general description of an assailant, an area of the crime, and any names of individuals known to be involved or associated with the crime in any way, and fuzzy logic of investigative tools 226 may query various databases available thereto to identify and harvest data and to spawn extended or indirect data identification, correlation, and/or harvesting of data, and compile a list of individuals having characteristics or attributes which predictive modeling suggest may be associated with the crime.

Preferred embodiments of the present invention may utilize report generators within the system to sort information according to a myriad of different report capabilities for providing information about inmates and their activities. For example, in addition to providing a list identifying potential suspects in response to an investigative query, embodiments of the present invention may present dossiers, such as may be compiled from available information, on the identified individuals.

It should be appreciated that, as communication/transaction services 221 of the preferred embodiment essentially provides the inmates' calling company, information management system 110 is in a unique position to obtain valuable investigative information, such as the inmate placing the call, the person who is accepting the call, and the content of the call. Moreover, information management system 110's deployment with respect to various aspects of controlled environment facility 100 provides a unique opportunity to collect additional information valuable to investigative aspects as well as provides a relationship with the facility and its personnel to facilitate assisting the investigator. Availability of information associated with a plurality of facilities, such as through the aforementioned connectivity of a plurality of information management systems 110 arid/or centralized implementation of information management system 110, facilitates data analysis and aggregation useful in spotting trends and relationships, as well as providing a more complete picture with respect to individuals and their activities. Accordingly, an investigator may utilize an information management system of an embodiment of the invention to perform a national number search to look across a plurality of controlled environment facilities and determine if there are common telephone numbers (or other addresses, e.g., email addresses, physical addresses, etcetera) contacted by residents of different controlled environment facilities. Likewise, an investigator may utilize an information management system of embodiments of the invention to perform a reverse lookup with respect to a telephone number (or other address, e.g., e-mail address, physical address, etcetera) a resident contacts, such as through the use of billing name and address attributes, account information, etcetera, and/or to perform background searches with respect to individuals contacted by a resident, such as to determine if the individual has a warrant outstanding, has a previous conviction, etcetera.

It should be appreciated that investigative tools 226 is not limited to use of information with respect to calls made outside of the inmate facility, such as utilizing detainee calling 521. For example, investigative tools 226 may utilize information with respect to visitation phones deployed within the inmate facility, such as by communication with visitation and administrative phones 523. For example, the investigator may be connected to a visitation call real-time as discussed above to allow him to listen to the conversation and/or a recording of the call may be provided to the investigator for further analysis. Additionally or alternatively, the investigator may be able to "barge" into the visitation call as discussed above.

Additionally, the connectivity provided by information portal 241 of the preferred embodiment may further facilitate assisting the investigator, such as it might relate to counties communicating with counties, counties communicating with police departments, etcetera. For example, investigators within the wails of the inmate facility may be enabled to tap into the law enforcement or other databases at the federal level, the state level, and/or the local level.

Such connectivity may not only be utilized to share information between various individuals, agencies, etcetera, but may also be used to aggregate, distil, and/or organize information, or example, the foregoing connectivity may be utilized to complete a dossier or "investigative jacket" on an individual or case by collecting information from various sources and/or by various investigators working with a dossier to develop a more complete picture of the individual or case.

Such connectivity may be utilized in providing broad outside functionality such as the warrant system of a preferred embodiment. Such a system may be utilized to efficiently determine inmates for which warrants are outstanding in other jurisdictions as well as to facilitate expedient disposal of many such warrants. For example, if someone is out on the street, such as having skipped bail for failing to appear for a court appearance, and a warrant was issued for their arrest, the level of integration provided by a preferred embodiment information management system facilitates analysis of such outstanding warrants with respect to an inmate, such as at the time of booking. Accordingly, facility administration manager 222 may cooperate with record management system 223 and/or information portal 241 to determine if there is an outstanding warrant. Information portal 241 may connect to information management systems associated with other controlled environment facilities, may access countywide, statewide, or countrywide systems, etcetera to determine if the particular individual being booked in using facility administration manager 222 has any outstanding warrants. For example, the system may communicate with the courts to obtain such information as a county which has issued a warrant.

According to a preferred embodiment information management system, not only are steps taken to determine if warrants are outstanding with respect to a particular individual, but further steps are taken to dispose of the warrants where possible. Therefore, after having determined a county in which an outstanding warrant exists for a particular individual, the system may communicate with the appropriate county agency to notify them that this individual is now in custody. There may be communication to verify that the person for which the warrant was issued is in fact the one in custody, such as by the information management system transmitting fingerprint, photographic information, and/or other biometric data.

It should be appreciated that the notified county could be hundreds of miles away which, in typical situations, would require the county issuing the warrant to dispatch personnel to obtain custody of the individual, while the arresting facility holds the individual (perhaps for a number of days) at their expense. However, preferred embodiments of the present invention facilitate disposal of particular types of warrants without physical transfer of the inmate and perhaps without the arresting facility holding the inmate for substantial periods of time. Specifically, the distance commerce aspect of the preferred embodiment, described in further detail below, facilitates the collection of funds, such as from friends or family at remote locations, and the distribution of funds to the agency issuing the warrant as well as to the arresting facility Accordingly, where the outstanding warrant may be satisfied by restitution and/or modest incarceration times, the agency issuing the warrant may be enabled to collect restitution via the preferred embodiment distance commerce aspect and thus satisfy the warrant. Similarly, the arresting facility may be reimbursed for their expenses in the arrest and/or incarceration of the individual from such funds and/or from a portion of the amounts paid to the agency issuing the warrant.

Distance commerce preferably provides such functionality as establishing and maintaining an account associated with each individual inmate, allowing deposits into such accounts by friends and family (such as telephonically, at retail locations, and in person at the controlled environment facility), allowing an inmate to obtain goods and services (such as placing telephone calls and obtaining commissary items) using an associated account for payment, and making credit worthiness decisions for management of the accounts. Accordingly, distance commerce according to the preferred embodiment involves technology that is integrated within the facility (such as one or more of vertical applications and modules 221-226, connect middle-ware 231, information portal 241, network 120, and user terminals 121-1 through 121-N and 122-1 through 122-M) and outside the walls of the facility (such as network 130 and user terminals 131-1 through 131-P).

Figure 6A:
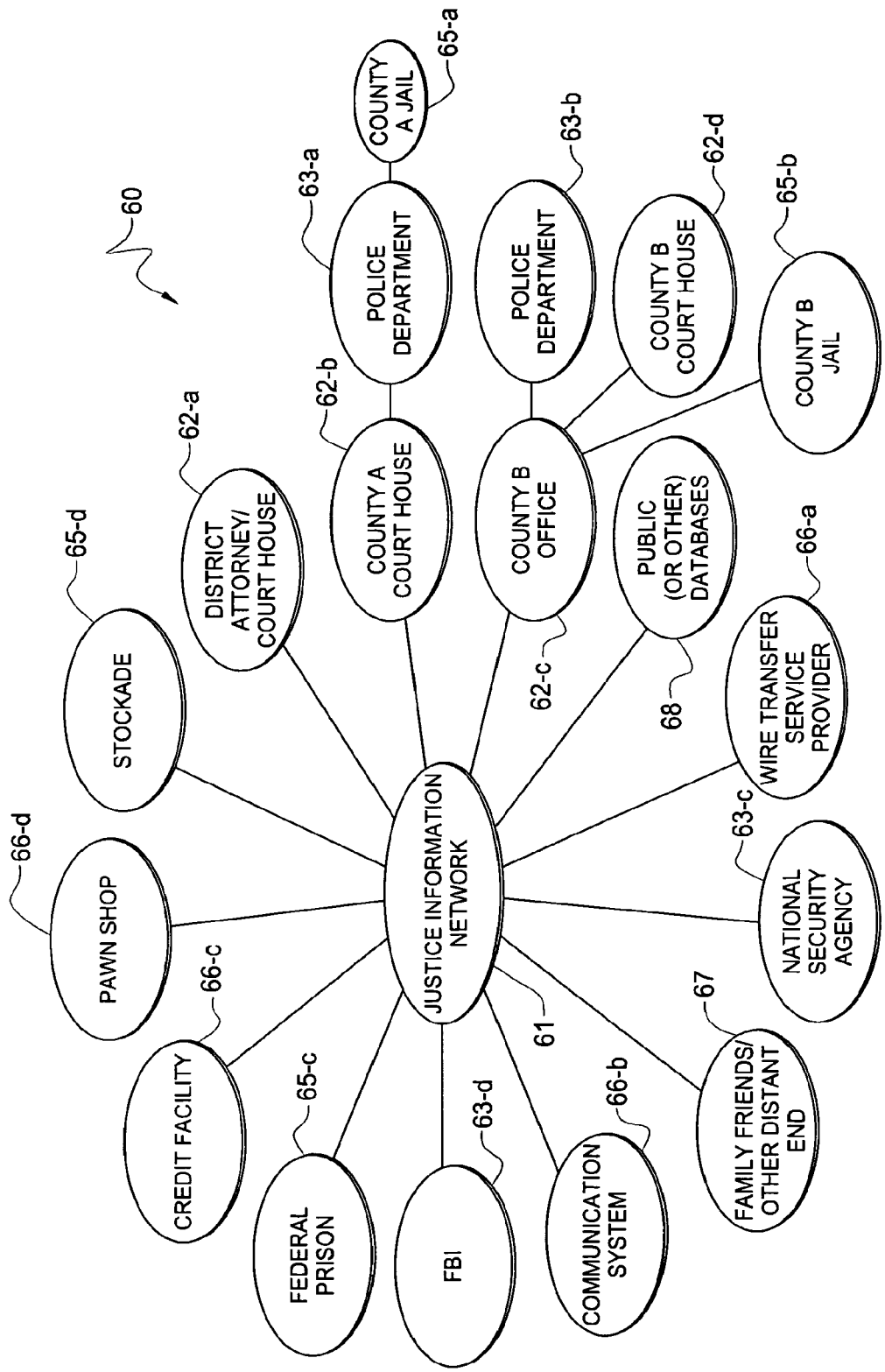
FIGS. 6A and 6B show illustrations of the flow of information over a network having data bases in diverse locations according to embodiments of the invention.

From the above it should be appreciated that information management systems of the present invention may implement data networking, whether with other information management systems or other data processing systems, to provide robust functionality as described herein. FIG. 6A shows architecture 60 according to one embodiment, providing an information network configuration including justice information network 61. Justice information network 61 of the illustrated embodiment provides a communication architecture allowing access to data from a plurality of locations, by a plurality of divergent users having different levels of authority and having different enterprise affiliations. For example, user terminals and/or information management systems may be disposed at any of a number of locations, such as facilities, businesses, homes, etcetera, such as government offices 62-*a* through 62-*d*, investigative services 63-*a* through 63-*d*, and/or prison facilities 65-*a* through 65-*d*, service providers 66-*a* through 66-*d*, and/or homes/businesses 67, with justice information network 61 facilitating information communication therebetween. The user terminals may include mobile and remote terminals, e.g., investigators on the street and terminals in patrol cars, to allow users to access, input, modify, query, etcetera information managed by one or more information management system.

Figure 6B:
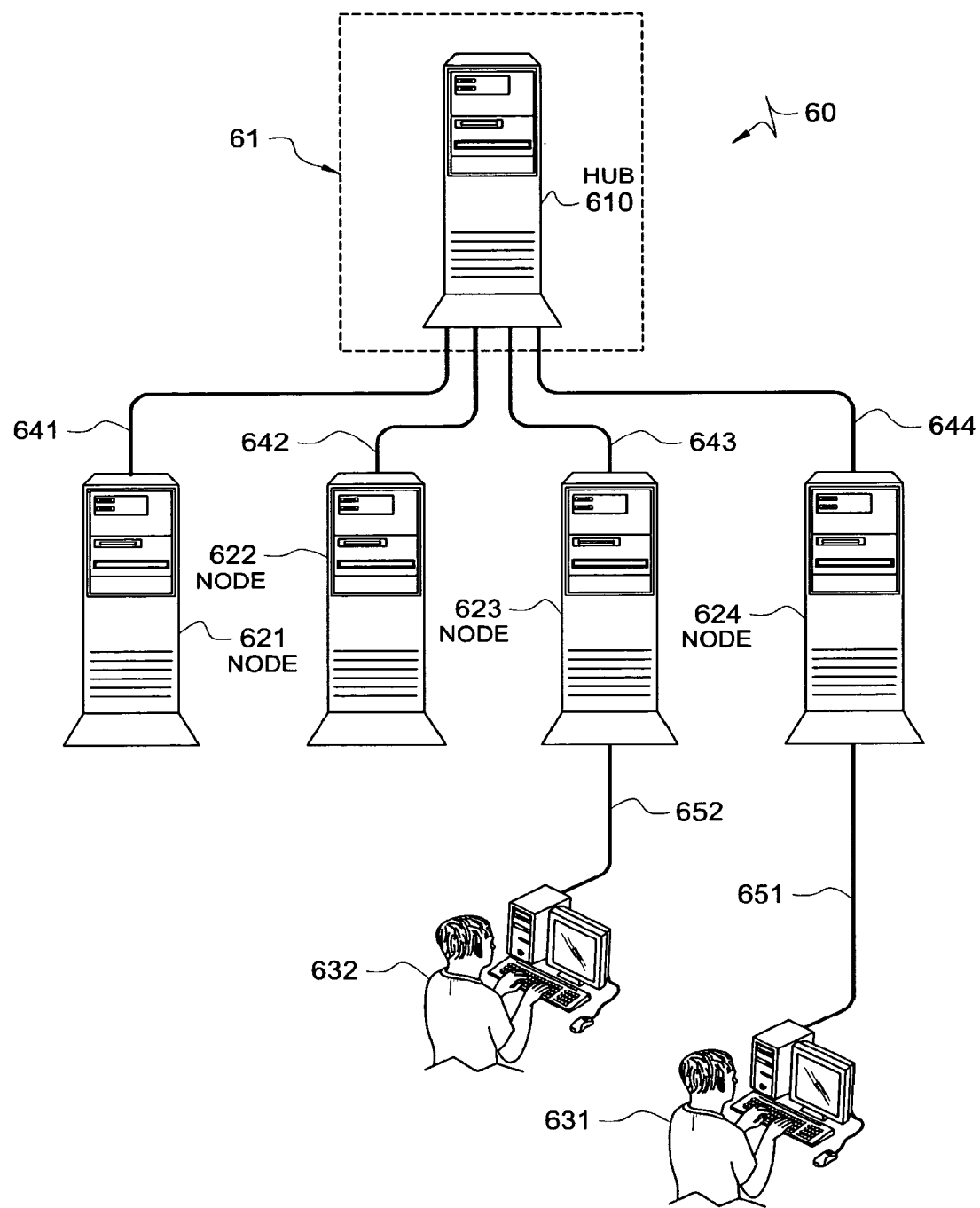

Directing attention to FIG. 6B, further detail with respect to a preferred embodiment configuration of architecture 60 is shown. In the embodiment illustrated in FIG. 6B, justice information network 61 comprises hub 610 providing information communication between nodes 621-624 and user terminals 631-632. It should be appreciated that the present invention is not limited to the particular number of user terminals, hubs, and/or nodes shown in FIG. 6B, but rather the particular configuration illustrated is merely exemplary of a possible configuration according to the teachings of the present invention.

Hub 610, nodes 621-624, and user terminals 631-632 may comprise computer systems, such as computer system 300 described with respect to FIG. 3 For example, according to one embodiment of the present invention, hub 610 comprises a computer system or computer systems based upon the Intel PENTIUM platform of CPUs configured to operate in a server capacity under control of the Linux operating system, as is well known in the art. Such a server configuration may have proprietary and/or open source software operable thereon to provide operation as described herein. Nodes 621-624, like hub 610, may comprise computer systems based upon the Intel PENTIUM platform of CPUs and having information management functionality associated therewith (e.g., call applications manager (CAM), also referred to herein as communication/transaction services, and/or justice applications manager (JAM), also referred to herein as facility administration manager) as described above with respect to FIGS. 1 and 2. User terminals 631-632, which again may comprise computer systems based upon the Intel PENTIUM platform of CPUs or other processor based systems (e.g., PDAs, pocket PCs, cellular telephones, etcetera), preferably have browser based or other client software operable thereon to provide operation as described herein.

It should be appreciated that nodes 621-624 may be deployed at any number of locations, such as in association with any of government offices 62-*a* through 62-*d*, investigative services 63-*a* through 63-*d*, and/or prison facilities 65-*a* through 65-*d* shown in FIG. 6A, may be disposed in a centralized or regionalized configuration, and/or may be mobile. Similarly, user terminals 631-632 may be deployed at any number of locations, such as in association with any of government offices 62-*a* through 62-*d*, investigative services 63-*a* through 63-*d*, and/or prison facilities 65-*a* through 65-*d*, service providers 66-*a* through 66-*d*, and/or homes/businesses 67 of FIG. 6A, and/or may be mobile. Hub 610 may also be deployed at a variety of locations, such as at a central location associated with a service provider facilitating the deployment and interconnection of information management and retrieval systems of the present invention.

Communication links 641-644, providing information communication between hub 610 and nodes 621-624, and communication links 651-652, providing information communication between nodes 621-624 and user terminals 631-632, may comprise any number of links, such as the PSTN, cellular networks, PCS networks, the Internet, cable transmission systems, satellite communication systems, electrically conductive transmission lines, fiber optic links, wireless LANs, LANs, MANs, WANs, intranets, extranets, and/or the like.

Although user terminals 631-632 are illustrated coupled to respective ones of nodes 623-624 and nodes 621-624 are illustrated coupled to hub 610, it should be appreciated that hub 610 may facilitate communication between any of nodes 621-624 and user terminals 631-632. For example, hub 610 may comprise various indices or lookup tables (LUTs) adapted to identify particular systems storing information relevant to a query from another system or user, and thus direct a connection between such systems and users. The connections provided in response to such queries may be provided through hub 610 (e.g., a user at user terminal 631 connected to node 624 may be coupled to node 622 via hub 610 using links 651, 644, and 642). Such a connection via hub 610 may be transparent to the users, thereby providing a virtual direct link between particular systems of architecture 60. Additionally or alternatively, hub 610 of embodiments of the present invention may facilitate more direct connections between systems and/or users (e.g., after querying hub 610 for identification of a system having information relevant to a query, node 624 may establish a link, such as via the Internet or PSTN, to the identified system, such as to connect to node 622 via a link (not shown) which does not include hub 610).

It should be appreciated that a plurality of different systems and information communication links may be implemented in providing a justice information network of the present invention. For example, referring again to FIG. A, systems of County A Courthouse 62-b, Police Department 63-a, and County A Jail 65-a may be interconnected and/or connected to justice information network 61 by a telephone line (or wireline or wireless), the Internet, a LAN connection, and/or the like. According to one embodiment of the present invention, these corresponding entities may utilize a same link to justice information network 61. For example, each of these corresponding entities may share the use of an information management system and utilize an interface thereof for linking to justice information network 61. Additionally or alternatively, these entities may utilize separate links for connecting to justice information network, such as where each such entity has an information management system associated therewith or where other systems of such entities are otherwise adapted for communication with justice information network 61.

Moreover, various ones of the entities illustrated in FIG. 6A may utilize different systems for accessing justice information network 61. For example, various ones of the entities, such as inmate facilities 65-a, 65-b, 65-c, and 65-d, may employ an information management system of their own, preferably having a variety of user terminals connected thereto. Alternatively, various ones of the entities, such as individuals/businesses 67 and service providers 66-a, 66-b, and 66-c, may employ user terminal equipment adapted to interface with information management systems of the present invention. As mentioned above, such user terminals may be operable under control of a web browser interface, a customized browser interface, or other user interface as desired.

Preferably, a wide range of facilities, agencies, business entities, individuals, and/or systems are provided access to and participate in architecture 60 of the preferred embodiment. For example, in the illustrated embodiment District Attorney/Courthouse 62-a is linked to justice information network 61, such as to provide data access and information exchange for the courts, judges, attorneys, etcetera. Additionally, County A Courthouse 62-b, Police Department 63-a, and County A Jail 65-a are shown interconnected and linked to justice information network 61 in the illustrated embodiment, such as to provide data access and information exchange for courts, judges, attorneys, sheriff's departments, constables, jail staff, inmates, etcetera. Similarly, County B Office 62-c, Police Department 63-b, County B Courthouse 62-c, and County B Jail 6-b, are shown interconnected and linked to justice information network 61 in the illustrated embodiment, such as to provide data access and information exchange for county officials, courts, judges, attorneys, sheriff's departments, constables, jail staff, inmates, etcetera. Also shown connected to justice information network 61 in the illustrated embodiment are private businesses 66-a, 66-b, 66-c, and 66-d (e.g., wire transfer service providers providing money and/or message transfer services, pawn shops providing information with respect to received items, credit facilities providing information with respect to individuals and/or funding for transactions, merchandise providers, etcetera), incarceration facilities 65-a, 65-b, 65-c, and 65-d (e.g., federal prison, military stockade, municipal jail, county jail, state penitentiary, etcetera), investigative agencies 63-a, 63-b, 63-c, and 63-d (e.g., police department, sheriff's department, National Security Agency (NSA), Federal Bureau of investigation (FBI), etcetera), and individuals/businesses 67 (e.g., family and friends of an inmate, victims, inmate's rights activists, etcetera).

In addition to the above identified facilities, agencies, business entities, and individuals coupled to justice information network 61 discussed above, FIG. 6A shows systems providing data and/or processing useful according to the present invention. For example, in addition to the aforementioned information management systems of the present invention, database 68 (e.g., a public database such as PUBLICDATA.COM) is shown coupled to justice information network 61 to provide an additional source of data to the users and systems thereof. Similarly, communication system 66-b (e.g., telephony message delivery system, interactive voice response system, electronic mail transmission system, etcetera) is shown coupled to justice information network 61 to provide a communication gateway useful therewith.

Systems of architecture 60 preferably use open Internet technology and standards which link diverse and incompatible systems. Embodiments of the invention utilize web services technology deployed in a services oriented architecture to provide data location, collection, compilation, aggregation, distillation, and/or reporting as described herein. The use of the aforementioned web services technology facilitates access to public databases, such as PublicData.com and RapSheets.com. The use of a services oriented architecture according to embodiments facilitates accessing information from vertical applications, such as communication/transaction service 221, facility administration manager 222, video arraignment/visitation 225, and investigative tools 226. For example, extensible interfaces, such as may utilize an extensible markup language (XML), may be implemented to collect, concatenate, and merge data associated with a plurality of facilities and individuals.

Although an architecture implemented according to embodiments of the invention may be centralized, e.g., with vertical applications and databases of a plurality of facilities located at a shared site, operation of preferred embodiments appears to users thereof as a decentralized architecture. For example, an investigator or facility administrator may utilize a user terminal to access information in a manner appearing as if the facility is equipped with a local information management system. However, the user terminal may be communicating with a centralized information management system which serves a plurality of facilities. Although operation of such a centralized information management system may provide access to one or more of the aforementioned vertical applications as if those applications were unique to a particular facility, data associated with, created by, and/or available from various facilities may be available to users, such as for investigative purposes.

Users are preferably provided seamless access to the various resources of the information management system, such as logging on a single time to access all of the resources available to that particular user. Of course, multiple levels of access for particular resources may be established with respect to a user, if desired.

Various user terminals, such as those implemented by users only casually related to the justice information network or systems thereof (e.g., friends and family members of an inmate, individuals and private businesses outside of the justice industry such as a pawn shop, victims, etcetera), may implement a web browser, as is well known in the art. Additionally or alternatively, various user terminals, such as those implemented by users more directly related to the justice information network or systems thereof (e.g., individuals and businesses directly involved in the justice industry such as prison staff, police, judges, prison commissary, etcetera, individuals and private businesses having a close or particular relationship with the justice industry such as businesses accepting payments for inmate accounts, businesses providing services such as video visitation, private detectives, etcetera), may implement an interface customized for use with the justice information network, such as a customized browser type interface. Of course, various features, options, and resources may be made available within a web browser or other user interface, such as based upon the particular user, a class of user, etcetera. It should be appreciated that such interfaces may be adapted to interface with biometric data collection devices, such as microphones (e.g., for voice prints), fingerprint scanners, iris and/or retina scanners, hand scanners, cameras (e.g., for face recognition), etcetera, and/or to otherwise use biometric data.

In operation according to a preferred embodiment, users of justice information network 61 will download a browser, such as one of the aforementioned browsers, to a user terminal, such as user terminals 631-632. The users may then use the browser to connect to an appropriate hub, such as a particular one of hubs 621-624 deployed at a facility to which the user is associated, and/or to connect to a justice information network hub, such as hub 610. Using the browser interface, users are preferably enabled to perform search engine based searches for desired information, such as inmate dossiers, call records, transaction records, etcetera, as stored throughout architecture 60. For example, nodes 621-624 may continually monitor justice applications manager functionality and/or call applications manager functionality to build accurate and current dossiers for each inmate associated therewith. Hub 610 may index inmate dossier information from nodes 621-624, such as continually or periodically. For example, nodes 621-624 may periodically send metadata derived from monitoring justice applications manager functionality and/or call applications manager functionality to facilitate advanced searching. When a query is issued via one of user terminals 631-632 by an authorized user and received at hub 610, the search query may be pointed to one or more of nodes 621-624 for the relevant information.

In one embodiment, a web browser is used at any number of user locations to gain access, by the user, to data contained in databases maintained at any number of facilities or other sources of information, thereby providing anytime, anywhere access to robust data. Interactive "web pages" may be provided to a user via a web browser which conveniently provides access to a number of tools useful to particular users. For example, one embodiment provides an investigator "dashboard" configuration as shown in FIG. 7 to facilitate investigators' access to investigator tools.

The embodiment illustrated in FIG. 7 provides web page 700, such as may be displayed upon a standard web browser, having menus comprising an investigator dashboard to present and facilitate selection of various investigative tools (e.g., provided by investigative tools 226 of FIG. 2) available to the particular user utilizing the web page. Specifically, web page 700 includes a main investigative tool menu 710 presenting such investigative tools as real-time monitoring, real-time call recording, remote call surveillance, detailed call log, remote call conferencing, call tracker, visitation phone monitoring, investigations case file generator, investigative reports, inmate alerts, mug shot lineup, inmate arrest history, audio/data recording, restricted reports, call detail reports, national database search, interagency assistant access, and inmate assistant access. Selection of an investigative tool from a menu of web page 700 may access a corresponding application, database, or system, perhaps via an intervening web page soliciting information such as a particular individual for which information is being requested, particular dates for which information is being requested, particular phone numbers or other addresses for which information is being requested, particular facilities for which information is being requested, and/or the like. Additionally or alternatively, various sub-menus may be associated with particular investigative tool selections. For example, sub-menus 720-770 are associated with particular selections of respective menus/sub-menus to present further options for selection. Such a menu structure may be implemented to guide a user through a plurality of selections of a robust system.

Figure 8:
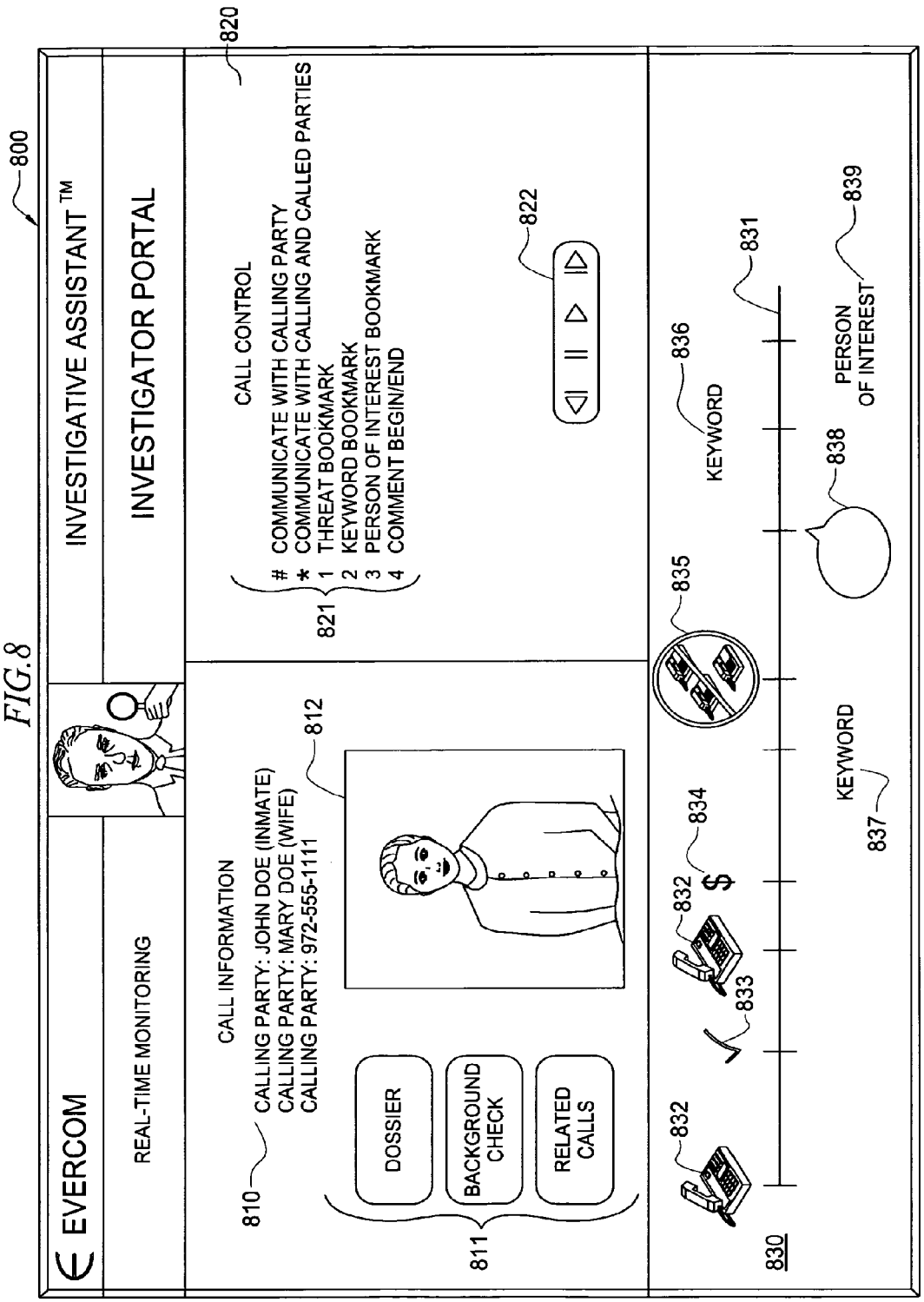
FIG. 8 shows an embodiment of a user interface used with respect to monitoring a call.

FIG. 8 shows an exemplary embodiment of a web page as may be provided to an investigator by an investigator dashboard or other user interface according to embodiments of the invention. Web page 800 of the illustrated embodiment provides an information and control user interface that may be used by an investigator in association with monitoring a call, such as by selecting "Real-Time Monitoring" from main investigative tool menu 710. For example, an investigator may receive an alert that a call meeting one or more monitoring criteria is in process and thus when the investigator selects "Real-Time Monitoring" from main investigative tool menu 710 the call having had an alert issued for that investigator is selected as an active call for monitoring and web page 800 is presented with information and control being provided with respect to the selected call. Similarly, where an investigator is currently monitoring a call via an audio connection (e.g., a telephone monitoring the call via a connection to the controlled environment information management system, wherein the investigator has been identified or authenticated by the system), selection of "Real-Time Monitoring" from main investigative tool menu 710 may result in that call being selected as an active call for monitoring and web page 800 is presented with information and control being provided with respect to the selected call. Additionally or alternatively, a user may select a particular call for monitoring using web page 800 from a menu of calls, such as may include calls associated with a particular identified person, calls originating from an identified address, location, facility, number, etcetera, calls directed to an identified address, location, facility, number etcetera, calls meeting one or more criteria, and/or the like.

Although the illustrated embodiment references real-time monitoring of a call, it should be appreciated that the same or similar information and control user interface may be utilized with respect to recorded monitored calls. Moreover, although embodiments are described herein with reference to a web page configuration, it should be appreciated that information and control user interfaces useful according to the invention may be implemented using various architectures and protocols.

Web page 800 of the illustrated embodiment includes various informational and control sections. Specifically, various information relevant to the call being monitored is presented in call information section 810 and various controls and/or control prompts are presented in call control section 820. In addition to the aforementioned call information section and call control section, the embodiment illustrated in FIG. 8 includes a graphical representation of the call in call representation section 830.

Call information section 810 of the illustrated embodiment provides various information with respect to a selected or active call As an example of information that may be presented in call information section 810, the illustrated embodiment includes information identifying the calling and called parties, such as may be determined from identification and/or validation of a calling or called party by controlled environment information management system 110, from accessing one or more databases (e.g., billing name and number (BNA), line information database (LIDB), etcetera), and/or the like. Moreover, the calling and/or called party information of the illustrated embodiment includes status information (e.g., inmate, family, attorney, etcetera), such as may be determined by controlled environment information management system 110 and/or from accessing one or more databases (e.g., personal allowed number (PAN) list, government records, internet search results, etcetera). The illustrated embodiment of call information section 810 further includes the called number. Of course, additional or alternative information, such as calling number, calling location, called location, call duration, call type (e.g., collect call, prepaid call, intralata call, etcetera), and/or the like, useful to a particular user may be included in call information section 810, if desired.

It should be appreciated that call information provided according to embodiments of the invention need not be passively presented. For example, call information section 810 of the illustrated embodiment includes buttons 811 providing interactive information presentation. For example, an investigator may select the "dossier" button to access dossier information, such as may provide detail with respect to a selected individual on the call. Similarly, an investigator may select the "background check" button to initiate and/or access a background report with respect to a selected individual on the call. The "related calls" button may be selected to provide a listing of calls which are related to the presently selected call in one way or another (e.g., having a person in common with the present call, having both persons in common with the present call, originating from a same address, location, facility, number, etcetera as the present call, calls directed to a same address, location, facility, number etcetera as the present call, calls having one or more criteria in common with the present call, and/or the like.

Call information provided according to embodiments of the invention need not be textual based. For example, call information section 810 of the illustrated embodiment includes graphical information 812. Graphical information 812 may comprise such information of an image (whether still or moving) of one or more parties to the call, one or more video streams from the call (e.g., where the call is multimedia), a map or geographic data showing locations for the calling and/or called parties, etcetera.

Call control section 820 provides various controls and/or control prompts in the illustrated embodiment For example, prompts 821 may provide a key by which an investigator is reminded or guided in pressing DTMF keys of a telephone for desired bookmarks while monitoring a call. Additionally or alternatively, prompts 821 may be interactive such that a user may select the prompt appearing in call control section 820 in order to place desired bookmarks while monitoring a call. It should be appreciated that the particular keys illustrated are arbitrary and may be varied as desired. For example, a system default may set an initial key configuration which is alterable on a user by user basis to suit individual users.

Call controls provided according to embodiments of the invention need not be textual based. For example, call playback control 822 of the illustrated embodiment provides graphical control input. Specifically, call playback control 822 of the illustrated embodiment includes graphically represented "rewind," "pause," "play," and "fast forward" buttons which may be used by an investigator while monitoring a call in order to control presentation of the call to the investigator.

Call representation section 830 provides a graphical representation of the selected call. For example, the illustrated embodiment provides timeline 831, as may scroll from right to left on web page 800 as the call progresses, to present a graphical representation of call events represented by one or more of event markers 832-838. A call may be graphically represented according to embodiments of the invention in forms other than a timeline, such as in a wave form representation, a call flow diagram, etcetera, if desired.

The embodiment of timeline 831illustrated in FIG. 8 includes various types of call events as well as call events identified by various sources. For example, call events 832-836 are automatically identified through operation of the call processing system, whereas call events 837-839 have been identified by an investigator monitoring the call.

In the illustrated embodiment, call event 832 may represent the calling party having initiated a call attempt (e.g., taking a user terminal off hook), call event 833 may represent the calling party having been identified and/or validated, call event 832 may represent the called party having responded to a call attempt (e.g., taking a user terminal off hook), and call event 834 may represent the called party having agreed to pay for the calling services (e.g., accepted a collect call or given an account from which funds are to be drawn). Each of the foregoing may collectively represent a somewhat typical call flow (or at least call flow beginning) for a call placed using controlled environment information management system. Call event 835 may represent detection of unauthorized or undesired activity during the call, such as an attempt to invoke a three-way call, and thus may represent a somewhat atypical event in a call flow. Call event 836 may represent detection of a particular keyword, such as may have been detected through automated speech analysis (e.g., speech to text and text comparison), spoken by one of the parties to the call Each of the events represented by call events 832-835 of the illustrated embodiment are preferably automatically detected by logic of the call processing system and placed in their relative positions with respect to timeline 831 to present a graphical representation of the call to a user of web page 800.

During monitoring of the call, an investigator or other user may place one or more bookmarks as described above. The illustrated embodiment of timeline 830 includes three such bookmarks as an example of operation of this functionality For example, at a time in the call corresponding to the location of call event 837 on timeline 831, the investigator may have pressed the DTMF "2" to mark a keyword (e.g., a word spoken in the call which is of interest, but which was not previously included in a list of keywords to be identified automatically by the call processing system). Similarly, at a time in the call corresponding to the location of call event 838 on timeline 831, the investigator may have pressed the DTMF "4" to mark a place at which a comment is to be inserted. The actual comment may be created in real-time, such as by the investigator speaking the comment, perhaps followed by pressing the DTMF "4" again to close the comment, or may be created after the call, such as after the call is released the investigator may select the icon representing call event 838 to insert, edit, modify, etcetera the comment. At a time in the call corresponding to the location of call event 839 on timeline 831, the investigator may have pressed the DTMF "3" to mark a person of interest having been referenced in the call. Each of the events represented by call events 837-839 of the illustrated embodiment are preferably identified by a user and placed in their relative positions with respect to timeline 831 to present a graphical representation of the call to a user of web page 800.

It should be appreciated from the above, that bookmarks or other call event identifiers may be textual or graphical based. Moreover, such bookmarks and/or call event identifiers may comprise audio, such as an audio clip of the associated time in the call, an audio explanation of the bookmark or event identifier (e.g., a spoken keyword or name of a person of interest).

It can be appreciated from the above that browser interfaces utilized according to embodiments of the invention provide a user friendly front end which seamlessly presents relevant information to users, irrespective of the sources, systems, databases, or combinations thereof from which it is obtained. Preferably browser interfaces utilized according the present invention are multimedia capable to facilitate presentation of text data, e.g. inmate records, audio data, e.g., recordings of inmate phone calls, and video data, e.g., photographs and streaming video. Accordingly, an investigator, for example, may listen to recorded calls, listen to live calls, barge into calls, view visitations, conference with other investigators, etcetera using a browser interface of embodiments of the invention. Such functionality may be provided anywhere, anytime, using communication links such as may comprise the Internet.

The foregoing investigative tool provides "one-stop shopping" for the investigator. Specifically, the investigator has the power of information across multiple databases to make decisions using an interface easily adopted into their investigative paradigm and providing situation awareness such that the investigator can see all aspects of a facility and/or an individual. Accordingly, an investigator need not monitor every call or other source of information, but instead may pinpoint which calls or information sources they want to concentrate on by more readily identifying those calls or information sources that tend to have the actionable issues and/or desired intelligence. Additionally, the foregoing investigative tool improves productivity for the investigator. For example, the investigator can easily download calls or other information, such as to take the information to court, provide access to information otherwise difficult for an investigator to obtain, facilitate communication with and sharing information between other investigators, etcetera.

Functionality in addition to or in the alternative to that described above may be provided by systems of embodiments of the present invention. For example, hub 610 and/or nodes 621-624 may provide desktop application deployment, such as to distribute appropriate copies of the aforementioned browsers and/or updates thereto, to appropriate ones of the user terminals. Nodes 621-624 may provide such functionality as facility intranet management, such as using a content management server.

Preferably, agencies, individuals, etcetera can establish partner settings to establish what type of information is to be shared and to whom such information is to be shared, such as by establishing multi-level security with respect to particular resources. For example, when an information management system of the present invention, such as such a system used by County A Courthouse 62-*b*, is coupled to justice information network 61, a user thereof may provide information as to what type of information County A Courthouse 62-*b* is agreeable to making available via justice information network 61 and, perhaps, information with respect to particular entities, users, and/or groups which are to be allowed access. The shared information could include, for example, call detail records, inmate dossiers, buying habits, credit, history of an individual's purchases, calls, etcetera. Those identified as authorized to access the information might include similar or corresponding facilities, such as Police Department 63-*a*, County A Jail 65-*a*, County B Office 62-*c* (and perhaps its corresponding facilities), particular individuals, such as management or staff of County A Courthouse 62-*b*, families and victims of inmates of County A Jail 63-*a*, and/or the like. Various levels of access may be assigned to one or more of the foregoing and security features implemented, such as network firewalls, secure communication protocols, data encryption and authentication, digital certificates, and/or the like, to protect against unauthorized access.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An investigative information system comprising:
 a communication services module operable to provide a direct telephonic communication between a resident of a controlled environment facility and a non-resident, wherein one of the resident and the non-resident is a dialing party to the direct telephonic communication, and the other of the resident and the non-resident is a dialed party to the direct telephonic communication; and an investigative tools module in communication with the communication services module operable to:
 identify that the direct telephonic communication is between the resident and the non-resident,
 provide, via a user interface on a communication device, an indication that the direct telephonic communication is ongoing, responsive to identifying the direct telephonic communication is between the resident and the non-resident, and
 allow an investigator, via the communication device, to connect to and monitor the direct telephonic communication in a muted state while the direct telephonic communication is ongoing, wherein during the muted state, all interference from the investigator, the communication device, and a combination thereof is prohibited from entering the direct telephonic communication.

2. The system of claim 1, wherein the investigative tools module further comprises a word search module configured to implement speech to text analysis to identify particular words within the direct telephonic communication and place event identifiers in association therewith, wherein responsive to identifying one or more of the particular words within the direct telephonic communication, the investigative tools module is configured to enable connection of the investigator to the direct telephonic communication.

3. The system of claim 1, wherein the investigative tools module comprises an event detection module configured to identify a particular event being initiated with respect to the direct telephonic communication and to place event identifiers in association therewith.

4. The system of claim 1, wherein the investigative tools module further allows the investigator to control one or more aspects of the direct telephonic communication.

5. The system of claim 4, wherein the one or more aspects comprises termination of the direct telephonic communication.

6. The system of claim 4, wherein the one or more aspects comprises muting at least one party of the direct telephonic communication.

7. The system of claim 4, wherein the one or more aspects comprises the investigator barging into the direct telephonic communication.

8. An investigative information system, comprising:
 an information portal operable to provide a user interface;
 an investigative tools module in communication with information portal, the investigative tools module operable to:
  display, via the user interface, an indication of an on-going telephone call between a first party and a second party, wherein the first party is a resident of a correctional facility;
  display, via the user interface, identifying information of the first party to the on-going telephone call;
  display, via the user interface, identifying information of the correctional facility;
  display, via the user interface, a telephone number associated with the on-going telephone call and the second party;
  display a map of a location associated with the telephone number;
  enable an audio connection to the on-going telephone call at the information portal, wherein no audio interference is input to the on-going telephone call from the information portal while the information portal is in a muted state;
  enable terminating the on-going telephone call; and
  enable transferring to another communication device an audio connection to the on-going telephone call, wherein no audio interference is input to the on-going telephone call from the other communication device while the other communication device is in a muted state.

9. An investigative information system, comprising:
 an information portal operable to provide a user interface;
 an investigative tools module in communication with information portal, the investigative tools module operable to:
  receive a recorded telephone call from a database, wherein the recorded telephone call is a recording of a telephone call between a first party and a second party, wherein the first party is a resident of a correctional facility;
  display, via the user interface, a waveform of the recorded telephone call;
  display, via the user interface, an indication of a detected three-way call attempt in the recorded telephone call, wherein the detected three-way call attempt is automatically detected by a call processing system;
  display, via the user interface, identifying information of the first party;
  display, via the user interface, identifying information of the correctional facility;
  display, via the user interface, a telephone number associated with the telephone call and the second party;
  play the recorded telephone call, wherein a graphical play button and a graphical pause button configured to cause the recorded telephone call to be played and paused, respectively, are displayed via the user interface;
  create, based on user input, a textual bookmark of an event of interest in the recorded telephone call;
  create, based on additional user input, a textual note relating to the recorded telephone call; and
  cause the textual bookmark and the textual note to be stored in association with the recorded telephone call in the database.

10. The system of claim 1, wherein the investigative tools module is further operable to, while the investigator is connected to the direct telephonic communication in the muted state, place one or more event identifiers in association with a recording of the direct telephonic communication in response to one or more signal inputs input to the communication device by the investigator, each of the one or more signal inputs being associated with an event of interest, each of the one or more event identifiers being a bookmark representing a different event of interest.

11. The system of claim 10, wherein the one or more signal inputs are dual-tone multi-frequency signal inputs.

12. The system of claim 10, wherein the one or more signal inputs are out of band signal inputs.

13. The system of claim 10, wherein the investigative tools module is further operable to, while not in the muted state, filter the one or more signal inputs from entering the direct telephonic communication while the direct telephonic communication is ongoing.

14. The system of claim 10, wherein the investigative tools module provides the user interface configured to display a dashboard including a timeline of the direct telephonic communication to the investigator, the timeline including the one or more event identifiers associated with the direct telephonic communication and configured to scroll as the direct telephonic communication progresses.

15. The system of claim 14, wherein the dashboard is further configured to include graphically represented buttons enabling the investigator to control presentation of the recording of the direct telephonic communication, while monitoring the direct telephonic communication.

16. The system of claim 10, wherein at least one event of interest comprises a presence of a threat in the direct telephonic communication.

17. The system of claim 10, wherein at least one event of interest comprises a presence of a keyword in the direct telephonic communication.

18. The system of claim 10, wherein at least one event of interest comprises a reference to a person of interest in the direct telephonic communication.

19. The system of claim 10, wherein at least one of the one or more event identifiers includes a comment with respect to the direct telephonic communication.

20. The system of claim 10, wherein the investigative tools module allows the investigator to define the event of interest associated with each of the one or more signal inputs.

21. The system of claim 14, wherein the dashboard includes an interactive information presentation comprising information associated with the direct telephonic communication, and allowing the investigator to obtain additional desired information.

22. The system of claim 14, wherein the dashboard includes information associated with the direct telephonic communication, wherein the information comprises prompts to guide the investigator with respect to the placing event identifiers.

23. The system of claim 14, wherein the dashboard includes information associated with the direct telephonic communication, wherein the information comprises one or more controls to facilitate the investigator controlling one or more aspects of the monitoring the direct telephonic communication.

* * * * *